US008449233B2

(12) United States Patent
Tatsuda

(10) Patent No.: US 8,449,233 B2
(45) Date of Patent: May 28, 2013

(54) CLAMP SLEEVE

(75) Inventor: Yoshinori Tatsuda, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 943 days.

(21) Appl. No.: 12/529,085

(22) PCT Filed: Feb. 20, 2008

(86) PCT No.: PCT/JP2008/052825
§ 371 (c)(1),
(2), (4) Date: Aug. 28, 2009

(87) PCT Pub. No.: WO2008/108171
PCT Pub. Date: Sep. 12, 2008

(65) Prior Publication Data
US 2010/0107813 A1    May 6, 2010

(30) Foreign Application Priority Data

Mar. 1, 2007    (JP) ................................ 2007-051347

(51) Int. Cl.
*B23B 31/30*    (2006.01)
(52) U.S. Cl.
CPC ...................................... *B23B 31/30* (2013.01)
USPC .............................. 409/201; 279/4.03; 188/67
(58) Field of Classification Search
USPC .............. 409/201; 279/4.03, 4.05; 192/85.12, 192/85.13, 85.47; 188/67, 265
IPC ....................................................... B23B 31/30
See application file for complete search history.

(56) References Cited

U.S. PATENT DOCUMENTS 4,557,645 A  *  12/1985  Marsland ...................... 409/144
5,722,646 A  *  3/1998  Soderberg et al. .............. 269/20
(Continued)

FOREIGN PATENT DOCUMENTS

DE    10 2005 026152 B3    7/2006
JP    1-175135 U    12/1989
(Continued)

OTHER PUBLICATIONS

International Search Report of PCT/JP2008/052825, Mailing Date of Apr. 1, 2008.
(Continued)

*Primary Examiner* — Daniel Howell
*Assistant Examiner* — Michael Vitale
(74) *Attorney, Agent, or Firm* — Westerman, Hattori, Daniels & Adrian, LLP

(57) ABSTRACT

A clamp sleeve for an indexing device is provided, the clamp sleeve being capable of providing a desirable clamping force without greatly increasing a fluid pressure, and having a long life. A clamp sleeve $34a$ has a through hole $34a7$ and an annular groove $34a1$ continuously provided around an outer periphery of the clamp sleeve $34a$ and defining a part of a pressure chamber $34d$. The annular groove $34a1$ includes a pair of inner end surfaces $34e6$, $34e6'$, a groove bottom surface $34e0$ extending in parallel to the through hole $34a7$, and arcuate first transition surfaces $34e1$, $34e1'$ provided between the inner end surfaces $34e6$, $34e6'$ and the groove bottom surface $34e0$. The annular groove $34a1$ is provided such that a thickness $t1$ in a region provided with the groove bottom surface $34e0$ is a thickness to allow the region to be deformable. A second transition surface $34e2$, $34e2'$ is provided between at least one of the first transition surfaces $34e1$, $34e1'$ and the groove bottom surface $34e0$, the second transition surface $34e2$, $34e2'$ having a further reduced curvature than a curvature of the first transition surfaces.

5 Claims, 11 Drawing Sheets

U.S. PATENT DOCUMENTS

| | | | |
|---|---|---|---|
| 5,957,443 A * | 9/1999 | Mascola | 269/22 |
| 7,059,594 B2 * | 6/2006 | Kawakami | 269/309 |
| 2002/0114678 A1 * | 8/2002 | Klement | 409/201 |
| 2005/0139036 A1 * | 6/2005 | Kato et al. | 74/813 L |

FOREIGN PATENT DOCUMENTS

| | | |
|---|---|---|
| JP | 4-105832 A | 4/1992 |
| JP | 2000-107963 A | 4/2000 |
| JP | 2002-103181 A | 4/2002 |
| JP | 2005-319586 A | 11/2005 |
| NL | 7411036 A | 2/1975 |
| WO | 96/23982 A1 | 8/1996 |

OTHER PUBLICATIONS

Supplementary European Search Report dated Mar. 18, 2011, issued in corresponding European Patent Application No. 08711631.5.

* cited by examiner

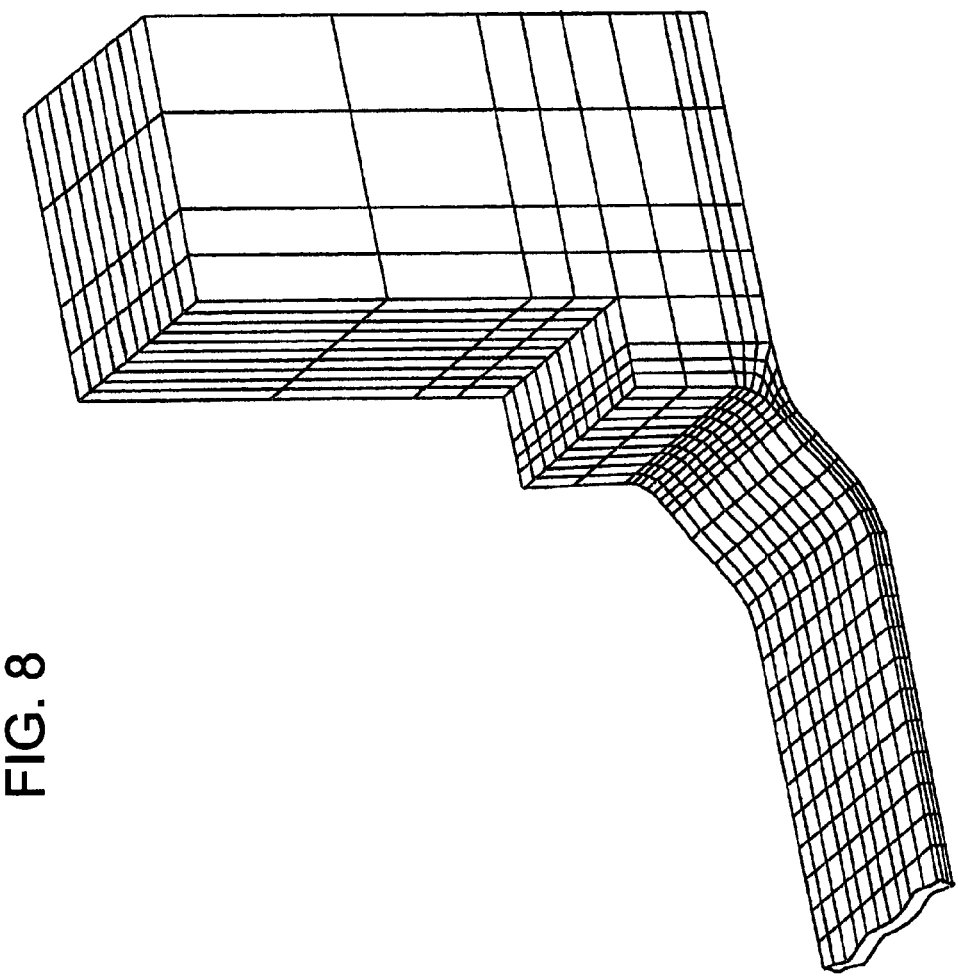
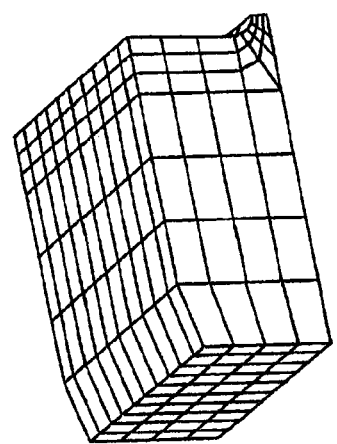
FIG. 8

000# CLAMP SLEEVE

TECHNICAL FIELD

The present invention relates to an indexing device used for a machine tool, and particularly, to a machining head including an indexing device used for a five-axis processing machine (processing machine capable of controlling five axes simultaneously) and a multi-face processing machine (machine tool), or to an indexing device (rotary table) for indexing an angle of a table on which a workpiece is mounted. More particularly, the present invention relates to a clamp sleeve which holds a position of a rotary shaft by supplying pressure fluid after an indexing operation.

BACKGROUND ART

A known indexing device is, for example, a device (rotary table) mounted on a bed of a machine tool and being capable of indexing a table on which a workpiece is mounted. For example, a rotary table disclosed in Patent Document 1 includes a frame having a through hole at the center of the frame, and a rotary shaft inserted into the through hole and supported rotatably relative to the frame. A table surface, on which a workpiece is mounted, of the rotary table is integrally provided with the rotary shaft. A worm wheel is accommodated within the frame, the worm wheel being integral with the rotary table. A worm spindle is also accommodated within the worm wheel in a manner meshing with the worm wheel. The worm spindle is linked with an actuator such as a servomotor. When the servomotor is rotationally driven, the rotary table being integral with the rotary shaft rotates by a desired angle, thereby carrying out an indexing operation.

Meanwhile, the rotary table disclosed in Patent Document 1 includes a clamp mechanism (clamp sleeve) which holds an angle (position) of the rotary table after the indexing operation. In particular, the rotary table includes a cylinder segment extending in parallel to the through hole of the frame and integrally provided with the rotary table, and a clamp sleeve having a ring shape and provided in a space between the cylinder segment and the frame. The clamp sleeve has a through hole therein. Also, the clamp sleeve includes, at an outer periphery thereof, a cylindrical portion fitted around the cylinder segment of the rotary table, and a flange portion continuously provided with the cylindrical portion and functioning as an attachment portion to the frame. The clamp sleeve has an annular groove provided around the cylindrical portion and extending along the outer periphery, so that a pressure chamber is formed between the annular groove and the through hole of the frame accommodating the cylindrical portion.

A clamp sleeve of related art used for a rotary table will be described below with reference to FIG. 11 which shows a peripheral portion of the clamp sleeve in an enlarged manner.

At a rotary table 103, a cylinder segment 104 extending in parallel to a through hole 102 of a frame 101 is integrally provided with the rotary table 103 through a screw member (not shown), and a clamp sleeve 105 having a ring shape is arranged in a space between the cylinder segment 104 and the through hole 102 of the frame 101. The clamp sleeve 105 includes a cylindrical portion 106 fitted around the cylinder segment 104 of the rotary table 103, and a flange portion 107 continuously provided with the cylindrical portion 106, extending outward in a radial direction, and functioning as an attachment portion to the frame 101. The clamp sleeve 105 has a through hole (inner peripheral end 110) therein for the continuously provide cylindrical portion 106 and flange portion 107. The flange portion 107 of the clamp sleeve 105 is fixed to an attachment portion (not shown) of the frame 101 through a screw member 115, and thus attached to the frame 101.

The cylindrical portion 106 has an annular groove 108 recessed from outer peripheral ends 109a, 109a', and extending around an outer periphery of the cylindrical portion 106. In particular, the annular groove 108 has a pair of inner end surfaces 109b, 109b' extending inward in the radial direction of a rotary shaft (not shown) and being separated from each other, and a groove bottom surface 109c extending in parallel to the through hole (inner peripheral end 110). Arcuate rounded surfaces 109d, 109d' continuously extend between the inner end surfaces 109b, 109b' and the groove bottom surface 109c. The rounded surfaces 109d, 109d' have a curvature radius of about several millimeters. A pressure chamber 112 is formed between the annular groove 108 thus provided and the through hole 102 of the frame 101 accommodating the cylindrical portion. Also, the annular groove 108 of the clamp sleeve 105, has a thin-wall section (linearly extending portion) 111 in a region q1 provided with the groove bottom surface 109c. The thin-wall section 111 has a thickness which allows the thin-wall section 111 to be deformable by supplying pressure fluid to the pressure chamber 112.

The through hole 102 has annular grooves (not shown) for accommodating seal members 113, 113'. The seal members 113, 113' are inserted into the annular grooves to be non-movable relative to the through holes 102 and to be in contact with the outer peripheral ends 109a, 109a' of the cylindrical portion. The seal members 113, 113' hold an air-tight or liquid-tight state for the pressure chamber 112 formed by the annular groove 108 and the through hole 102 of the frame 101 accommodating the cylindrical portion. On the other hand, the frame 101 has a channel 114 communicating with a fluid supply source (not shown) and the pressure chamber 112. During a clamping operation, the thin-wall section 111 expands inward in the radial direction of the rotary shaft by pressure fluid, e.g., pressure air or pressure oil, supplied to the pressure chamber 112. The thin-wall section 111 presses the cylinder segment 104 of the rotary table 103. Hence, the rotary table 103 with the angle thereof previously positioned can be held in a non-rotatable manner relative to the frame 101.

As such a rotary table, a rotary table is disclosed in Patent Document 1, in which rotation of an electric motor is transmitted to a table through a worm mechanism included in the rotary table. Alternatively, a rotary table is developed, in which a direct-drive type motor, that is, a DD motor, is included therein. For example, the rotary table is disclosed in Japanese Patent Application No. 2005-319586 suggested by the applicant of the present invention.

Patent Document 1: Japanese Unexamined Patent Application Publication No. 2002-103181 (FIGS. 1, 3)

DISCLOSURE OF INVENTION

Problems to be Solved by the Invention

The clamp sleeve is included in the rotary table, and therefore, the external dimension of the entire clamp sleeve is desired to be as small (compact) as possible. In addition, the clamp sleeve has to rigidly hold the indexed angle even when a large force is applied to the table such as during machining a workpiece in a machine tool with the rotary table mounted. To generate a necessary clamping force, a certain length is necessary for the length in an axial direction of the thin-wall section 111 (section length of the region q1 shown in FIG. 11). To secure the section length, a curvature radius r1 of the rounded surfaces 109*d*, 109*d'* is set as small as several millimeters as described above, the rounded surfaces 109*d*, 109*d'* serving as first transition surfaces continuously extending between the inner end surfaces 109*b*, 109*b'* and the outer peripheral end 109*c*.

When the pressure fluid is supplied to the pressure chamber 112 formed by the clamp sleeve, as indicated by dotted lines in the drawing, the thin-wall section 111 is greatly deformed in relatively narrow regions (i.e., regions q7 in the drawing) proximate to connection points p1, p1' connecting the rounded surfaces 109*d*, 109*d'* serving as the first transition surfaces and the groove bottom surface 109*c*. Hence, as a clamping operation and an unclamping operation are repeated, fatigue progresses intensively in the narrow regions, resulting in the bottom being cracked. The clamping function may be degraded. The clamp sleeve of related art, in fact, has to be replaced at an interval of about 1 to 1.5 year. The life is relatively short.

A countermeasure for the problem may be increasing the curvature radius of the rounded surfaces serving as the first transition surfaces. However, as described above, the external dimension of the clamp sleeve is restricted as described above. It is difficult to secure the sufficient length of the thin-wall section 111 with a constant thickness t1. In light of the situation, a desirable clamping force is obtained by increasing the supply pressure of the pressure fluid. However, the seal members 113, 113', which hold an air-tight or liquid-tight state for the pressure chamber 112, the channel 114, and a fluid circuit, may be damaged, resulting in another problem of decreasing the life of the members.

The present invention is made in light of the situations. An object of the present invention is, in an indexing device which holds a rotary shaft by causing a clamp sleeve to expand with pressure fluid after indexing is carried out, to provide a long-life clamp sleeve capable of providing a desirable clamping force although a fluid pressure to be supplied to the clamp sleeve is not greatly increased.

Means for Solving the Problems

The present invention provides a clamp sleeve arranged between a rotary shaft and a frame outside the rotary shaft and having a through hole and an annular groove, the annular groove continuously provided around an outer periphery of the clamp sleeve and defining a part of a pressure chamber to which pressure fluid is supplied. The annular groove includes a pair of facing inner end surfaces extending in a radial direction with respect to an axis line and separated from each other, a groove bottom surface extending in parallel to the through hole, and arcuate first transition surfaces provided between the inner end surfaces and the groove bottom surface. The annular groove is provided such that a thickness t1 in a region provided with the groove bottom surface is a thickness to allow the region to be deformable when the pressure fluid is supplied to the pressure chamber. As a feature of the clamp sleeve of the present invention, a second transition surface is provided at a side proximate to at least one of the two inner end surfaces, at a position between the first transition surface and the groove bottom surface, the second transition surface having a further reduced curvature than a curvature of the first transition surfaces.

Advantages

With the aspect, when the pressure fluid is supplied to the pressure chamber during a clamping operation, the region with the annular groove of the clamp sleeve attached to the frame is deformed such that the region with the annular groove extending from a region provided with the second transition surface to a region provided with the bottom groove surface is deformed in a bending manner. At least the region provided with the groove bottom surface expands toward the rotary shaft and presses the rotary shaft. Hence, the clamp sleeve can hold the rotary shaft non-movably relative to the frame. Also, the second transition surface is provided such that a distance between the second transition surface and the through hole gradually increases from the start point proximate to the groove bottom surface toward the end point. In particular, in the region provided with the second transition surface, the thickness of that region is decreased toward the region provided with the groove bottom surface so that the thickness gradually approaches to the thickness t1 of a deformable thin-wall section defined by the groove bottom surface and the through hole. Accordingly, a deformation of the region provided with the annular groove when the pressure fluid is supplied to the pressure chamber is gradually increased toward the thin-wall section in the region provided with the groove bottom surface. The deformation is constant in the region provided with the groove bottom surface.

That is, since the second transition surface is provided such that the distance between the second transition surface and the through hole is gradually increased from the start point proximate to the groove bottom surface toward the end point, in the region provided with the second transition surface, the deformation is gradually increased toward the inside in the axial direction. Thus, the bottom of the clamp sleeve is gradually deformed in a bending manner. That is, a portion which is greatly deformed in a narrow region is not provided, unlike a clamp sleeve in which a transition surface with a rapid curvature of related art is continuously arranged from a groove bottom surface. Consequently, even when deformation is repeated by clamping and unclamping operations, progress in fatigue at the bottom of an annular groove becomes slower than that of related art. The life becomes long.

More specifically, the second transition surface with the further reduced curvature than that of the first transition surface may be provided by one of a linearly inclined surface continuously arranged from the start point proximate to the groove bottom surface to the end point (i.e., a tapered surface with a curvature radius approximate to infinite), and a recessed arcuate surface (i.e., an arcuate surface which protrudes downward toward the rotary shaft with respect to a segment connecting the start and end points). Preferably, the second transition surface may be provided such that an axial length L1 from the start point proximate to the groove bottom surface to the end point is 4 mm or larger, and that an increase L2 of the distance between the second transition surface and the through hole in a section between the start point proximate to the groove bottom surface and the end point is in a range of from 0.5 to 6 mm.

Further preferably, a third transition surface may be provided between the groove bottom surface and the second transition surface, the third transition surface having a further reduced curvature than that of the second transition surface. Accordingly, fatigue does not intensively progress in the region proximate to a connecting point of the two surfaces at the bottom of the annular groove, unlike a configuration in which the second transition surface is directly connected to the groove bottom surface. Thus, the clamp sleeve can have a longer life. The third transition surface may be provided by one of a substantially linearly inclined surface (i.e., a tapered surface with a curvature radius approximate to infinite), and a recessed arcuate surface with a larger curvature radius than that of the second transition surface.

An indexing device for a machine tool to which the clamp sleeve is applied may be an indexing mechanism for a spindle unit to which a tool is attached, the indexing mechanism being applied to a machining head for a machine tool, or an indexing device for indexing an angle of a table on which a workpiece is mounted (i.e., rotary table supported by a frame through a rotary shaft integrally provided with a table).

BRIEF DESCRIPTION OF DRAWINGS

FIG. 3 includes two side views showing the support head component included in the machining head of the present invention, in which FIG. 3(A) shows a state where a cover 18a is removed from a leg segment 30a viewed from a side farthest from a leg segment 30b, and FIG. 3(B) shows a state where a cover 18b is removed from a leg segment 30b viewed from a side farthest from the leg segment 30a.

FIG. 8 is a perspective view showing a finite element model used for bending stress analysis of the clamp sleeve according to the first embodiment of the present invention, the view showing a deformed (distorted) state of the clamp sleeve.

Figure 1:
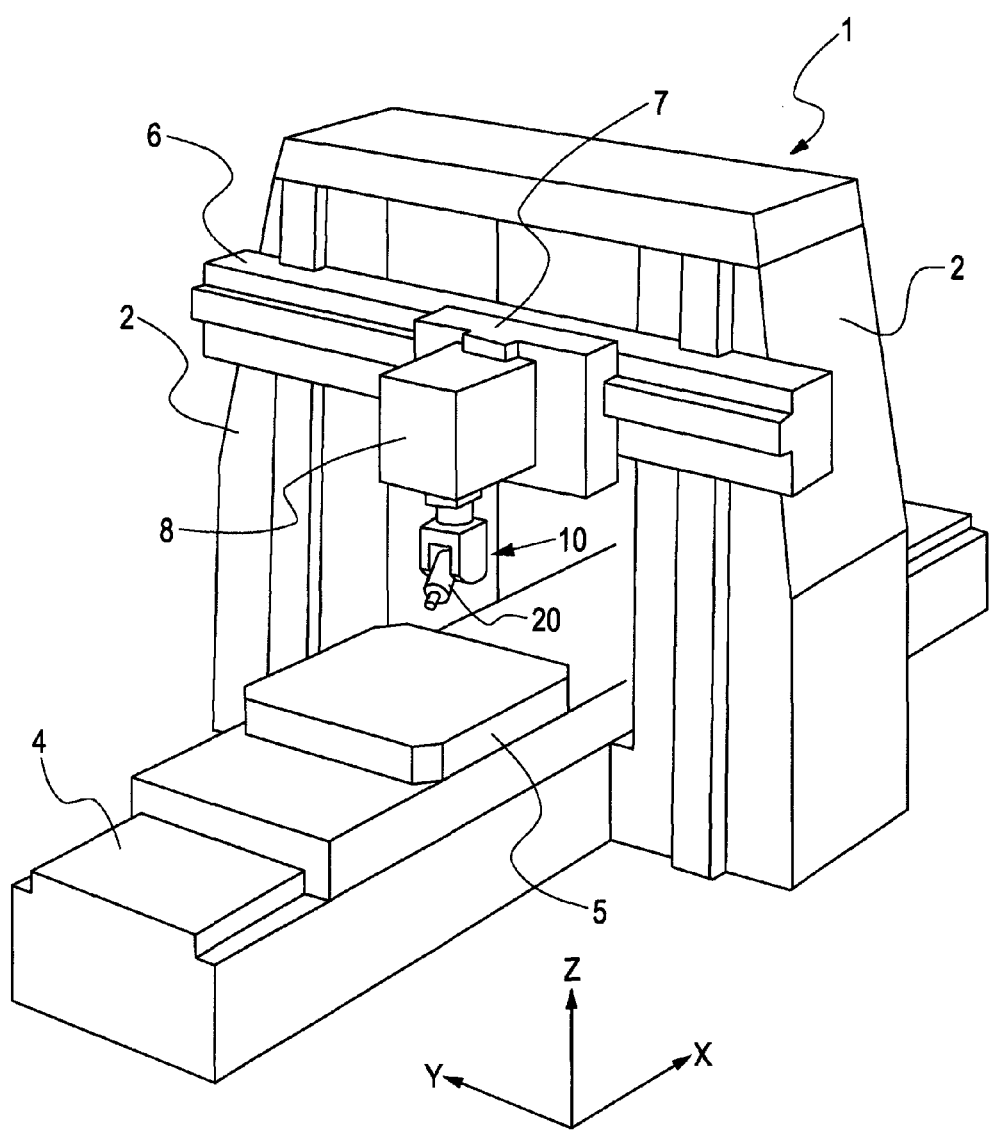
FIG. 1 is a perspective view showing an example of a machine tool (machining head) to which an indexing device according to the present invention is applied.

REFERENCE NUMERALS 1 machine tool
10 machining head
20 spindle unit
21 spindle
25 DD motor
25a rotor
25b stator
30 support head component (first support head component)
30a, 30b leg segment
30c supporting segment
31a, 31b housing
32 rotary shaft
33 DD motor
33a rotor
33b stator
34 clamp mechanism
34a clamp sleeve
34a1 annular groove
34a2 cylindrical portion
34a3 flange portion
34a4 channel
34a5 thin-wall section (linearly extending portion)
34a7 inner peripheral end
34b pressure-receiving member
34b1 channel
34b2 outer peripheral end
34b3 inner peripheral end
34d pressure chamber
34e0 groove bottom surface
34e1, 34e1' first transition surface
34e2, 34e2', 34e7, 34e7' second transition surface
34e3 third transition surface
34e5 outer peripheral end
34e6 inner end surface
34f1 gap
34g1 seal member
35, 36 bearing
37 rotary joint
37a distributor
37b shaft
38 rotary joint
38a distributor
38b shaft
39 rotary shaft
41, 44 rotation detector
41a, 44a detector stator
41b, 44b detector rotor
50 second support head component
51 housing
52 rotary shaft
53 DD motor
53a stator
53b rotor
54 clamp sleeve
55 distributor
56 bearing (triple cylindrical roller bearing)
57 bearing

BEST MODES FOR CARRYING OUT THE INVENTION

An indexing device of the present invention will be described below on the basis of an example in which an indexing device is included in a machining head for a machine tool, as an indexing mechanism for a spindle unit to which a tool is attached.

FIG. 1 illustrates a double-housing machine tool (called machining center) 1, as an example of a compound processing machine. The double-housing machine tool 1 includes left and right columns 2, 2 attached to a bed 4, a cross rail 6 movable vertically (along Z axis) on the columns 2, 2, a saddle 7 movable horizontally (along Y axis) on the cross rail 6, a ram 8 movable along the Z axis on the saddle 7, and a table 5 movable in the front-back direction (along X axis) on the bed 4. Furthermore, the ram 8 has a machining head 10 attached thereto, which includes a spindle unit 20 including a spindle to which a tool is attached.

When machining a workpiece, the double-housing machine tool 1 moves the table 5, the cross rail 6, the saddle 7, and the ram 8, and the machining head 10 indexes the angular position of the spindle unit 20 in accordance with numerical control based on a preliminarily set program. Accordingly, in the machine tool 1, the tool can be set at appropriate angles for machining various surfaces of the workpiece so that the workpiece can be cut into complicated shapes.

In order to achieve this, the machining head includes an indexing mechanism for indexing the angular position of the spindle unit. The machining head is one including a drive motor of a direct-drive type (referred to as "DD motor" hereinafter) as means for driving the indexing mechanism. The DD motor includes a motor stator and a motor rotor disposed within a housing of the machining head 10, and the rotor is linked with a support shaft that supports the spindle unit. The machining head includes the spindle unit (head) and a support head component (head support portion) that supports the spindle unit, and has an inner-rotor-type DD motor in the support head component, as the means for driving, in which the rotor surfaces the inner peripheral surface of the stator. Such a machining head is, for example, disclosed in Japanese Unexamined Patent Application Publication No. 2-116437.

The machining head 10 will be described in more detail with reference to FIGS. 2 to 4.

Figure 2:
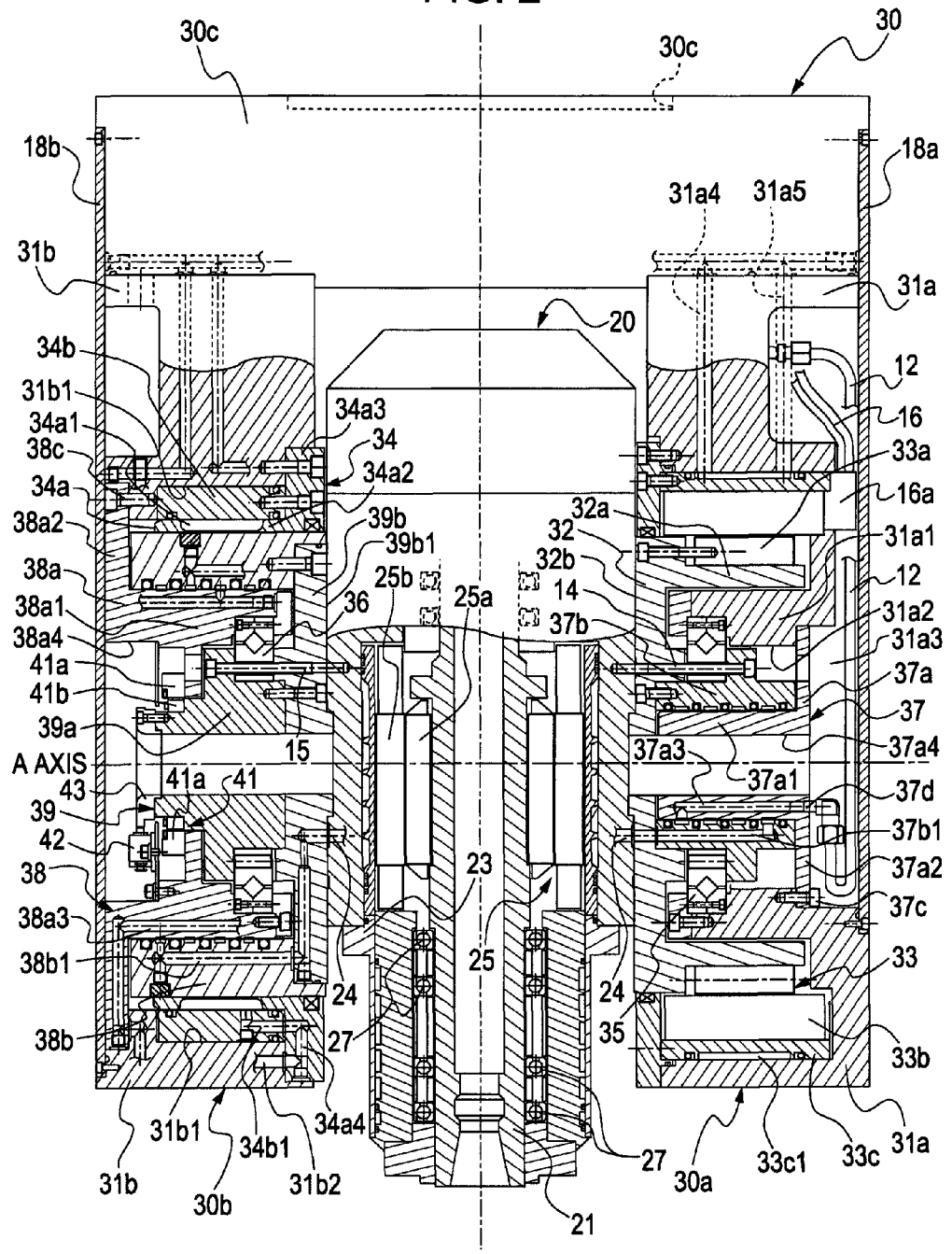
FIG. 2 is a front partially-cutaway view of a support head component according to an embodiment included in a machining head of the present invention.
Figure 3:
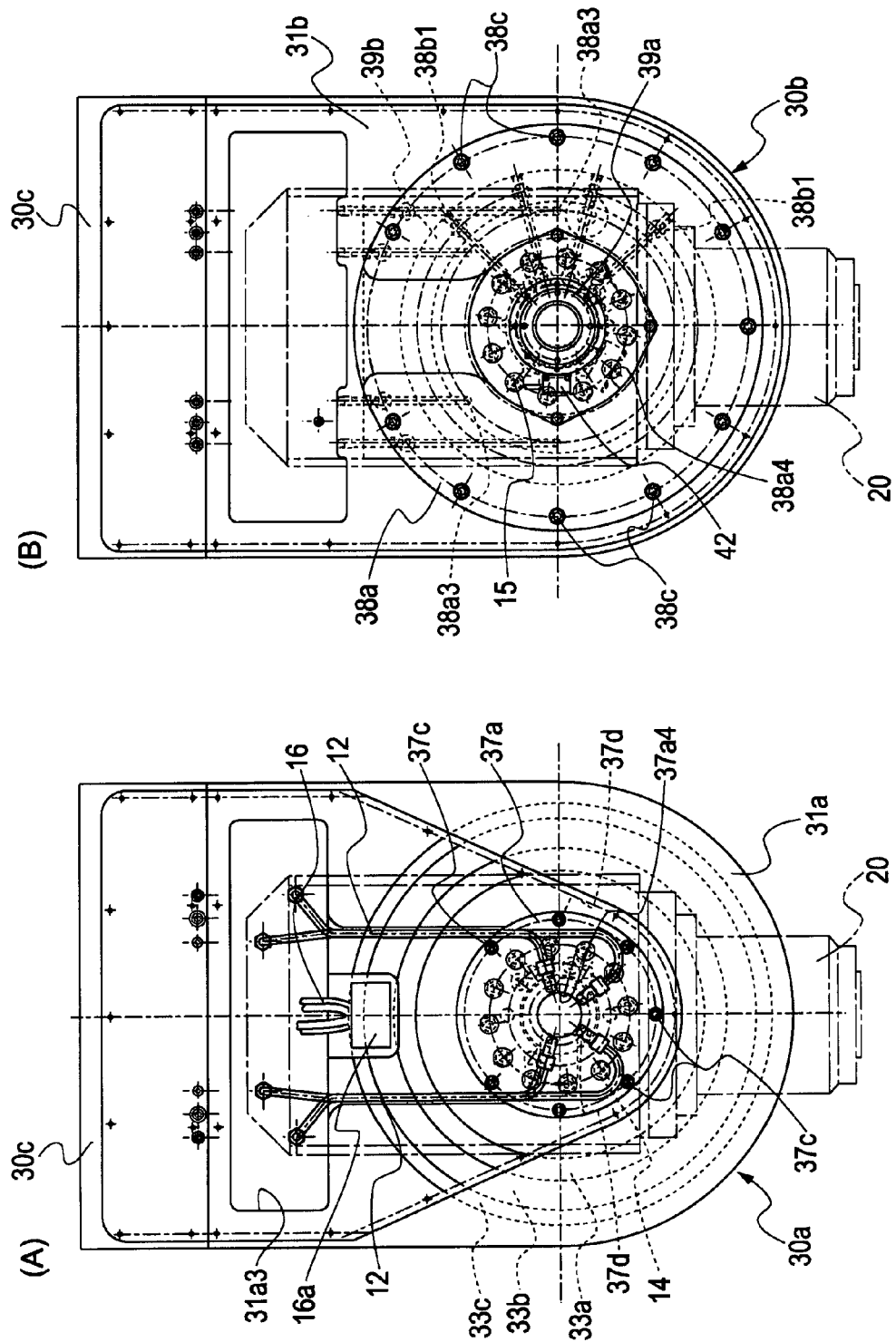
Figure 4:
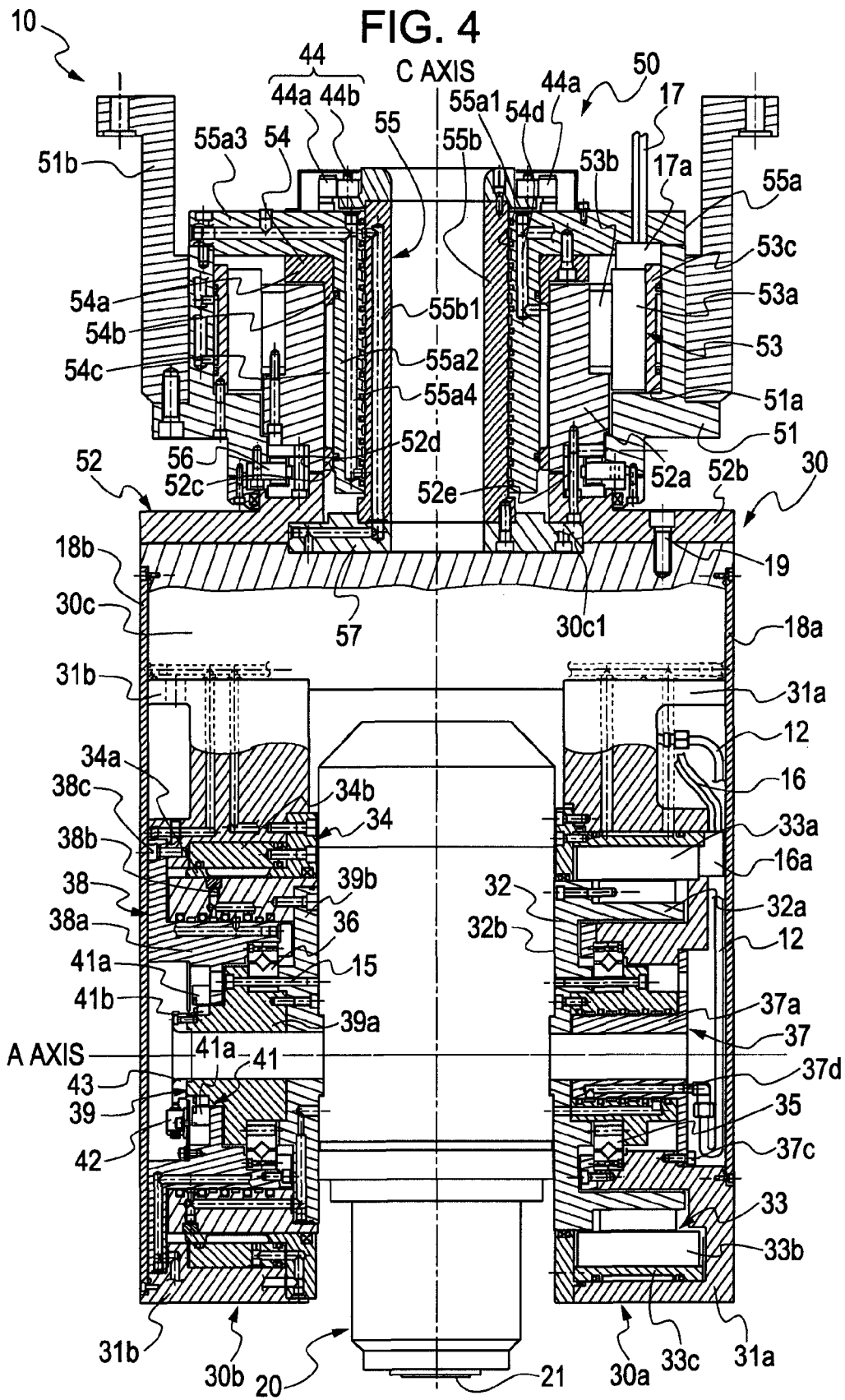
FIG. 4 is a front partially-cutaway view of the machining head according to the embodiment of the present invention.

FIGS. 2 to 4 illustrate an embodiment of the present invention. The machining head 10 in the drawing includes the spindle unit 20 having a spindle 21 to which a tool is attached, a first support head component 30 (corresponding to "support head component" of the present invention) that supports the spindle unit 20, and a second support head component 50 that supports the first support head component 30 (FIG. 4).

The spindle unit 20 is a spindle head having a drive motor built therein, and the built-in drive motor rotates the spindle 21 at high speed (FIG. 2).

A housing 23 of the spindle unit 20 has the spindle 21 extending therethrough and accommodates a drive motor 25 that surrounds the spindle 21. The drive motor 25 includes a rotor 25a fitted around the spindle 21, and a stator 25b facing an outer peripheral surface of the rotor 25a. The spindle 21 is rotatably supported by a plurality of bearings (for example, angular contact bearings) 27 arranged in a front-back direction of the drive motor 25 (in the vertical direction in the figure). When an exciting current is supplied to the stator 25b, an excitation force is generated between the rotor 25a and the stator 25b. The rotor 25a rotates in response to the excitation force, whereby the spindle 21 is rotated.

In addition to supporting the spindle unit 20, the first support head component 30 has a function of rotating the spindle unit 20 around an axis line (referred to as "A axis" hereinafter) extending perpendicular to a rotary axis line of the spindle 21 in order to index the angular position of the spindle unit 20.

The first support head component 30 has the shape of a fork in which a pair of leg segments 30a, 30b is joined to a supporting segment 30c. The leg segments 30a, 30b support the spindle unit 20. Each of the leg segments 30a, 30b includes therein a rotatable support shaft that supports the spindle unit 20. In the support head component in the drawing, a DD motor (corresponding to "drive motor" of the present invention) that rotationally drives the spindle unit 20 is disposed only in the leg segment 30a of the two leg segments 30a, 30b. Accordingly, regarding the support shafts in the respective leg segments 30a, 30b, the support shaft in the leg segment 30a will be referred to as a driving support shaft (corresponding to "support shaft" of the present invention) hereinafter, whereas the support shaft in the leg segment 30b will be referred to as a driven support shaft hereinafter.

The configuration of the leg segment 30a will be described in detail below.

The leg segment 30a has, as a main body, a housing 31a. The housing 31a accommodates, for example, a rotor (motor rotor) 33a and a stator (motor stator) 33b that constitute a DD motor 33, the driving support shaft that supports the spindle unit 20, a bearing (for example, cross roller bearing) 35 for rotatably supporting the driving support shaft, and a rotary joint 37 for supplying processing fluid (referred to merely as "fluid" hereinafter) to the spindle unit 20.

A side of the housing 31a proximate to the leg segment 30b has a large opening through which the DD motor 33 and a rotary shaft (described below), are inserted. Moreover, the housing 31a also has a cylindrical portion 31a1 extending along the A axis from a side surface of the housing 31a farthest from the leg segment 30b. The cylindrical portion 31a1 has a through hole 31a2 through which the rotary joint 37 extends along the A axis. The side surface of the housing 31a farthest from the leg segment 30b has a recess 31a3 through which a fluid-supply pipe and a current-supply cable (described below) extend. A side of the leg segment 30a farthest from the leg segment 30b has a side-surface cover 18a attached thereto. The side-surface cover 18a covers the recess 31a3. FIG. 3 shows a state where the side-surface cover 18a is removed. In particular, FIG. 3(A) shows a state where the cover 18a is removed from the leg segment 30a viewed from the side farthest from the leg segment 30b, and FIG. 3(B) shows a state where the cover 18b is removed from the leg segment 30b viewed from the side farthest from the leg segment 30a.

The rotary joint 37 includes a distributor 37a fixed to the housing 31a and a shaft 37b rotatably fitted around an outer peripheral surface of a cylindrical portion 37a1 of the distributor 37a.

In a state where the distributor 37a extends through the through hole 31a2 of the housing 31a, a flange portion 37a2 of the distributor 37a is attached to the housing 31a with a plurality of screw members 37c arranged in a circumferential direction. Furthermore, the center of the distributor 37a is provided with a through hole 37a4 through which, for example, cables can extend toward the spindle unit 20.

The distributor 37a also has a plurality of fluid channels 37a3 that are arranged at different positions in the circumferential direction. The fluid channels 37a3 are provided for supplying or discharging fluid. On the other hand, the shaft 37b has a plurality of fluid channels 37b1 that correspond to the fluid channels 37a3 of the distributor 37a. In FIG. 2, only one of the fluid channels 37a3 and one of the fluid channels 37b1 are representatively shown.

The fluid channels 37a3 and the fluid channels 37b1 corresponding thereto communicate with each other through annular grooves formed continuously over the entire circumference of an engagement surface between the distributor 37a and the shaft 37b. This communication state is maintained even upon rotation of the shaft 37b. Furthermore, each of the fluid channels 37b1 communicates with a fluid supply or discharge port 24 of the spindle unit 20. The distributor 37a and the shaft 37b have seal members interposed therebetween for attaining a sealed state between the annular grooves.

The distributor 37a also has a plurality of fluid supply or discharge ports 37d arranged at different positions in the circumferential direction. Each of the ports 37d is connected to a fluid supply or discharge pipe 12. Fluid supplied from a fluid control circuit (not shown) through a supply pipe 12 is transferred from the rotary joint 37 to the spindle unit 20 through the corresponding port 24. When the fluid is subject to circulation, the fluid circulating within the spindle unit 20 is discharged to a discharge pipe 12 via the rotary joint 37. The fluid to be supplied to the spindle unit 20 is, for example, cooling oil for cooling the DD motor 25 or the spindle 21 that rotates at high speed, sealing air for preventing cutting chips and powder from entering the spindle unit 20 (i.e., the rotating portion of the spindle 21), and cooling water for cooling the rotating tool and the like used during the machining process.

The DD motor 33 includes the stator 33*b* disposed to be fixed with respect to the housing 31*a*, and the rotor 33*a* disposed to surface the inner peripheral surface of the stator 33*b*. The rotor 33*a* is integrally attached with a cylindrical portion 32*a* so as to be fitted on the outer periphery of the cylindrical portion 32*a* of a rotary shaft 32. In particular, the DD motor 33 in the drawing serving as the inner-rotor-type motor is constituted as a permanent magnet synchronous brushless DC motor in which, in the rotor 33*a*, a plurality of poles are magnetic poles formed of permanent magnets whose material is rear-earth metal or the like and the plurality of magnetic poles are arranged in the circumferential direction such that the magnetic poles adjacent to each other in the circumferential direction are alternately reversed, in the stator 33*b*, a plurality of electromagnets that generate magnetic forces when currents are applied thereto are arranged in the circumferential direction corresponding to the magnetic poles of the rotor, and the rotor 33*a* is rotated by selectively applying currents to the electromagnets in the stator 33.

The stator 33*b* is fitted to the inner peripheral surface of a stator sleeve 33*c* fixed to the housing 31*a*. The stator sleeve 33*c* has an annular groove 33*c*1 in an outer peripheral surface thereof. On the other hand, the housing 31*a* has a fluid supply path 31*a*4 and a fluid discharge path 31*a*5 that communicate with the annular groove 33*c*1. A cooling fluid (for example, oil) for cooling the DD motor 33 is supplied from the fluid supply path 31*a*4 towards the annular groove 33*c*1 so as to decrease heat generated by the DD motor 33 due to the rotation of the rotor 33*a*. The annular groove 33*c*1 has a helical shape so that when fluid is supplied from the fluid supply path 31*a*4, the fluid circulates the annular groove 33*c*1 so as to be discharged from the fluid discharge path 31*a*5 (although not shown specifically in the drawings).

The rotor 33*a* is fitted around an outer peripheral surface of the rotary shaft 32 rotatably disposed within the housing 31*a*. The rotary shaft 32 is disposed concentrically with a rotary axis line of the shaft 37*b* of the rotary joint 37 and is fixed to the shaft 37*b* with a plurality of screw members arranged in the circumferential direction. The rotor 33*a* is disposed such that its outer peripheral surface surfaces the inner peripheral surface of the stator 33*b*. The rotor 33*a* is fitted around an outer peripheral surface of a cylindrical portion 32*a* of the rotary shaft 32 in a non-rotatable manner relative to the rotary shaft 32.

An end surface 32*b* of the rotary shaft 32 proximate to the leg segment 30*b* has the spindle unit 20 fixed thereto with a plurality of screw members 14 arranged in the circumferential direction. In other words, the spindle unit 20 is fixed to the end surface 32*b* of the rotary shaft 32 so as to be supported by the rotary shaft 32 in an integral manner. Consequently, in the leg segment 30*a*, the rotary shaft 32 and the shaft 37*b* of the rotary joint 37 rotating together with the rotary shaft 32 constitute the driving support shaft for the spindle unit 20.

In a state where the rotary shaft 32 is joined to the shaft 37*b* of the rotary joint 37, the cylindrical portion 32*a* of the rotary shaft 32 surrounds the cylindrical portion 31*a*1 of the housing 31*a* with a slight gap therebetween. In other words, in a state where the rotary shaft 32 is joined to the shaft 37*b*, the cylindrical portion 31*a*1 of the housing 31*a* is disposed within the inner peripheral surface of the cylindrical portion 32*a*, i.e., within the rotor 33*a* in the radial direction, the rotor 33*a* fitted around the cylindrical portion 32*a*.

The cylindrical portion 31*a*1 of the housing 31*a* and the shaft 37*b* of the rotary joint 37 arranged within the through hole 31*a*2 of the cylindrical portion 31*a*1 have the bearing 35 interposed therebetween. The bearing 35 provides a state where the shaft 37*b* is rotatably supported by the housing 31*a*.

As described above, in the illustrated embodiment, the driving support shaft (the shaft 37*b* of the rotary joint 37 and the rotary shaft 32 attached to the shaft 37*b*) includes a large-diameter section (the cylindrical portion 32*a* of the rotary shaft 32) around which the rotor 33*a* of the DD motor 33 is fitted, and a shaft section (the shaft 37*b* of the rotary joint 37) disposed within this large-diameter section in the radial direction and supported rotatably by the bearing 35. The cylindrical portion 31*a*1 of the housing 31*a* is disposed between the large-diameter section and the shaft section, and the bearing 35 is interposed between the cylindrical portion 31*a*1 and the support shaft. Accordingly, the support shaft is rotatably supported by the housing 31*a*. As shown in the drawings, the positioning of the bearing 35 along the A axis is within a range occupied by the DD motor 33 along the A axis.

The configuration of the leg segment 30*b* that supports the spindle unit 20 at a position opposite to the leg segment 30*a* will be described in detail below.

The leg segment 30*b* has, as a main body, a housing 31*b*. The housing 31*b* accommodates, for example, a clamp mechanism 34 for holding an angular position of the spindle unit 20, the driven support shaft that supports the spindle unit 20, a bearing 36 for rotatably supporting the driven support shaft, and a rotary joint 38.

The housing 31*b* has a through hole 31*b*1 extending therethrough along the A axis. The clamp mechanism 34, the driven support shaft, the bearing 36, and the rotary joint 38 are accommodated within this through hole 31*b*1. A side surface of the housing 31*b* farthest from the leg segment 30*a* has a recess (not shown) like that provided in the leg segment 30*a*. The recess is covered with a side-surface cover 18*b*.

The rotary joint 38 is similar to the rotary joint 37 of the leg segment 30*a*, and includes a distributor 38*a* fixed to the housing 31*b* and a shaft 38*b* rotatably fitted around an outer peripheral surface of a cylindrical portion 38*a*1 of the distributor 38*a*.

The distributor 38*a* includes the above-described cylindrical portion 38*a*1, and a flange portion 38*a*2 extending outward radially from an end of the cylindrical portion 38*a*1 farthest from the leg segment 30*b*. The flange portion 38*a*2 of the distributor 38*a* is joined to the housing 31*b* with a plurality of screw members 38*c* arranged in the circumferential direction. Furthermore, the center of the distributor 38*a* is provided with a through hole 38*a*4 extending along the A axis.

The distributor 38*a* has a plurality of fluid channels 38*a*3 arranged at different positions in the circumferential direction. On the other hand, the shaft 38*b* has a plurality of fluid channels 38*b*1 that correspond to the fluid channels 38*a*3 of the distributor 38*a*. The fluid channels 38*a*3 and the fluid channels 38*b*1 corresponding thereto communicate with each other through annular grooves extending around an engagement surface between the distributor 38*a* and the shaft 38*b*. This communication state is maintained even upon rotation of the shaft 38*b*.

In the leg segment 30*b*, a rotary shaft 39 corresponding to the rotary shaft 32 of the leg segment 30*a* receives the bearing 36, and hence, the rotary shaft 39 includes two members of a shaft member 39*a* and a flange member 39*b*. The rotary shaft 39 (the shaft member 39*a* and the flange member 39*b*) is disposed such that a rotary axis line thereof is aligned with the rotary axis line (that is, A axis) of the rotary shaft 32 in the leg segment 30*a*.

The shaft member 39a of the rotary shaft 39 is arranged in the through hole 38a4 of the distributor 38a. The shaft member 39a is rotatably supported by the distributor 38a via the bearing 36. Thus, the shaft member 39a and the distributor 38a are arranged to be concentrically with the A axis.

The flange member 39b of the rotary shaft 39 has an end surface 39b1 at a side thereof proximate to the leg segment 30b. The end surface 39b1 is parallel to the end surface 32b of the rotary shaft 32 in the leg segment 30a. The end surface 39b1 has the spindle unit 20 fixed thereto with a plurality of screw members 15 arranged in the circumferential direction. Consequently, in the leg segment 30b, the rotary shaft 39 functions as the driven support shaft for the spindle unit 20. The rotary shaft 39 is fixed to the shaft 38b of the rotary joint 38 at the flange member 39b, and hence is rotated with the shaft 38b simultaneously. Accordingly, the shaft 38b of the rotary joint 38 is also part of the driven support shaft.

Figure 5:
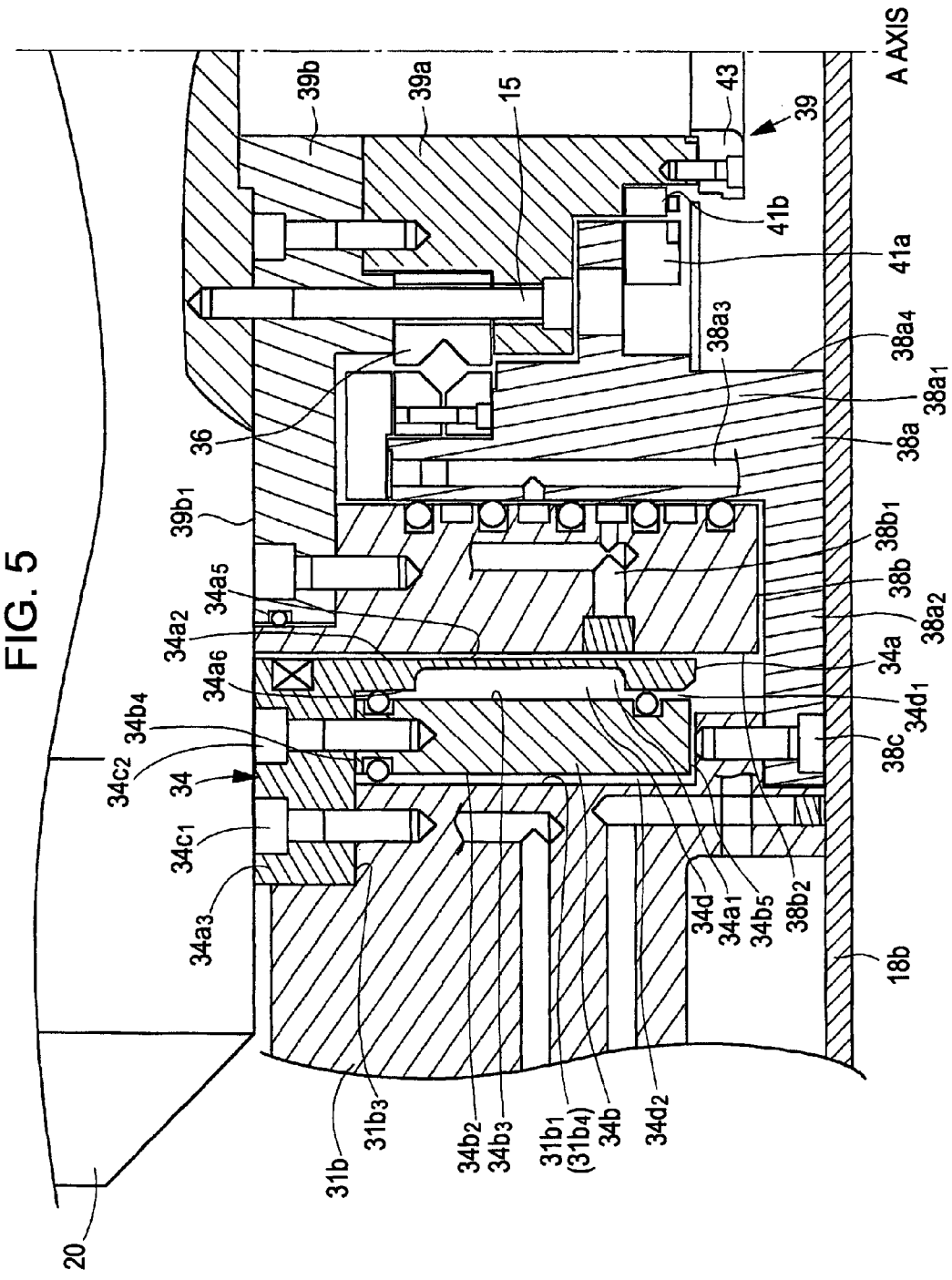
FIG. 5 is an enlarged front partially-cutaway view showing a clamp mechanism in the machining head of the present invention.

The clamp mechanism 34 for holding the rotational position (angular position) of the spindle unit 20 is mainly constituted by a clamp sleeve 34a having a ring shape (FIG. 2, FIG. 5). The clamp sleeve 34a includes a cylindrical portion 34a2 having an annular groove 34a1 that forms a pressure chamber, and a flange portion 34a3 extending outward radially from an end of the cylindrical portion 34a2 proximate to the leg segment 30a. The cylindrical portion 34a2 surrounds the shaft 38b of the rotary joint 38, which is rotated with the rotary shaft 39, in a manner such that the cylindrical portion 34a2 permits rotation of the shaft 38b.

The housing 31b has an attachment portion 31b3 continuously arranged from the through hole 31b1. The attachment seat 31b3 has a plane extending radially outward with respect to the A axis so as to receive the clamp sleeve 34a extending through the through hole 31b1. On the other hand, the flange portion 34a3 of the clamp sleeve 34a has a plurality of through holes to which screw members 34c2 are inserted when a pressure-receiving member 34b (described below) is attached, and a plurality of through holes to which screw members 34c1 are inserted when the clamp sleeve 34a is attached to the housing 31b. The through holes are arranged in the circumferential direction at an interval.

The cylindrical portion 34a2 of the clamp sleeve 34a and the through hole 31b1 of the housing 31b have a cylindrical pressure-receiving member 34b interposed therebetween. The pressure-receiving member 34b is fitted to the inside of the housing 31b1. In particular, the pressure-receiving member 34b has a plurality of screw holes corresponding to the plurality of through holes in the flange portion 34a3. The cylindrical pressure-receiving member 34b is inserted to be fitted around the cylindrical portion 34a2 of the clamp sleeve 34a, and the screw members 34c2 are screwed into the corresponding screw holes of the pressure-receiving member 34b through the plurality of through holes of the flange portion 34a. As described above, the pressure-receiving member 34b is fitted around the clamp sleeve 34a. The clamp sleeve 34a is inserted such that the mounted pressure-receiving member 34b is fitted into the through hole 31b1. The attachment seat 31b3 of the housing 31b has a plurality of screw holes corresponding to the plurality of through holes provided in the circumferential direction of the pressure-receiving member 34b. The clamp sleeve 34a is attached to the attachment seat 31b3 by inserting the screw members 34c1 from the through holes of the flange portion 34a and screwing the screw members 34c1 into the screw holes. Thus, the clamp sleeve 34a is fitted into the housing 31b.

Shaft ends 34b4, 34b5 of the pressure-receiving member 34b have planes continuously arranged in the circumferential direction and extending in a direction orthogonal to the radial direction. The shaft end 34b4 is arranged to engage with the flange portion 34a3 of the clamp sleeve 34a. At an inner peripheral surface 31b3 of the pressure-receiving member 34b, O-rings (not shown) are arranged at positions on both sides of the annular groove 34a1 over the entire circumference of the inner peripheral surface 31b3. Accordingly, the pressure chamber 34d can hold an air-tight or liquid-tight state. Also, a fluid channel 34b1 provided in the pressure-receiving member 34b communicates with the pressure chamber 34d (FIG. 2). The fluid channel 34b1 communicates with a fluid channel 31b2 provided in the housing 31b through a fluid channel 34a4 provided in the flange portion 34a3 of the clamp sleeve 34a.

In the clamp mechanism 34, when pressure fluid (for example, pressure oil) is supplied to the pressure chamber 34d through these fluid channels, a thin-wall section 34a5 at the cylindrical portion 34a2 of the clamp sleeve 34a, which corresponds to the annular groove 34a1, becomes deformed inward in the radial direction of the cylindrical portion 34a2. As a result, a clamping force acts on the shaft 38a, whereby a state is attained in which the shaft 38b and the rotary shaft 39 joined thereto are prevented from rotating (clamping state).

When the pressure of the fluid (pressure oil) supplied to the pressure chamber through the fluid control circuit is released, the deformed state in which the thin-wall section of the cylindrical portion 34a2 is deformed is released, and the clamping force acting on the shaft 38b is eliminated. Consequently, the clamping state for the rotary shaft 39 is released.

Further, in the embodiment shown in the drawing, the leg segment 30b also includes a rotation detector 41 for detecting the rotational angle of the rotary shaft 39 (i.e., the angular position of the spindle unit 20) and an angle detector 42 for limiting the rotational range of the spindle unit 20.

The rotation detector 41 includes a pair of detector heads 41a, 41a disposed within the through hole 38a4 of the distributor 38a of the rotary joint 38, at predetermined positions on a disc-shaped support portion protruding from the inner peripheral surface of the through hole 38a4 outward in the radial direction, and a detector ring 41b which is attached to the shaft member 39a of the rotary shaft 39, and is disposed to surface the inner sides of the detector heads 41a, 41a. A detection signal detected by the rotation detector 41 that indicates the angular position of the spindle unit 20 is sent to a control apparatus (not shown) of a machine tool in which the machining head 10 according to the present invention is installed. The detection signal is used for rotation control (numerical control) of the spindle unit 20.

The angle detector 42 is, for example, a limit switch, which is attached onto a support plate provided within the through hole 38a4 of the distributor 38a to surface a peripheral surface of a disc-shaped member 43 attached to an end of the rotary shaft 39. The peripheral surface of the disc-shaped member 43 is provided with a dog that corresponds to a permissible angle range. When the limit switch 42 is opposed to the dog, the limit switch 42 is in an inoperative mode. Consequently, when the spindle unit 20 rotates to exceed a permissible angle due to, for example, control failure, the limit switch 42 detects the condition and sends a detection signal to the control apparatus of the machine tool as, for example, an emergency stoppage signal.

That is, the leg segments 30a, 30b rotatably retain the spindle unit 20 from both sides constitute an indexing device which indexes the spindle unit 20 around the A axis as a rotational center. The leg segment 30b also constitutes an indexing device provided with the clamp mechanism with pressure fluid.

To be more specific, the leg segment 30b includes the housing 31b having the through hole 31b1 at the center thereof; the rotary shaft 39 (the flange member 39b and the rotary shaft 39a) extending through the through hole 31b1 of the housing 31b and rotatably supported by the housing 31b; the shaft 38b provided with the rotary shaft 39a, separated from the rotational center (A axis) in the radial direction, and extending in the axial direction; the clamp sleeve 34a having the ring-shaped cylindrical portion 34a2 fitted around the outer peripheral end of the shaft 38b; and the pressure-receiving member 34b having the cylindrical shape.

The clamp sleeve 34a having a ring shape includes the cylindrical portion 34a2 provided with the annular groove 34a1, and the flange portion 34a3 extending outward in the radial direction from the end portion of the cylindrical portion 34a2 and integrally formed with the cylindrical portion 34a2. In addition, the clamp sleeve 34a includes the inner peripheral end 34a5, serving as the through hole, at the inside of the continuously arranged cylindrical portion 34a2 and flange portion 34a3. On the other hand, the housing 31b1 includes the attachment portion 31b3 having the engagement surface extending outward in the radial direction from the through hole 31b1 to receive the flange portion 34a3 of the clamp sleeve 34a. The pressure-receiving member 34b is coaxially inserted such that the shaft end 34b4 engages with the flange portion 34a3 of the clamp sleeve 34a and is attached to the flange portion 34a3 through the plurality of fastening members 34c2 screwed into the plurality of screw holes provided in the flange portion 34a3. Also, the flange portion 34a3 of the clamp sleeve 34a is fixed to the attachment portion 31b3 of the housing 31b, and hence the flange portion 34a3 is non-movably attached to the housing 31b, serving as the frame. Thusly, the pressure-receiving member 34b is attached to the housing 31b through the flange portion 34b3. The clamp sleeve 34a is arranged between the cylinder segment 38b integrally provided with the rotary shaft 39a, and the housing 31b provided outside the cylinder segment 38b.

Figure 6:
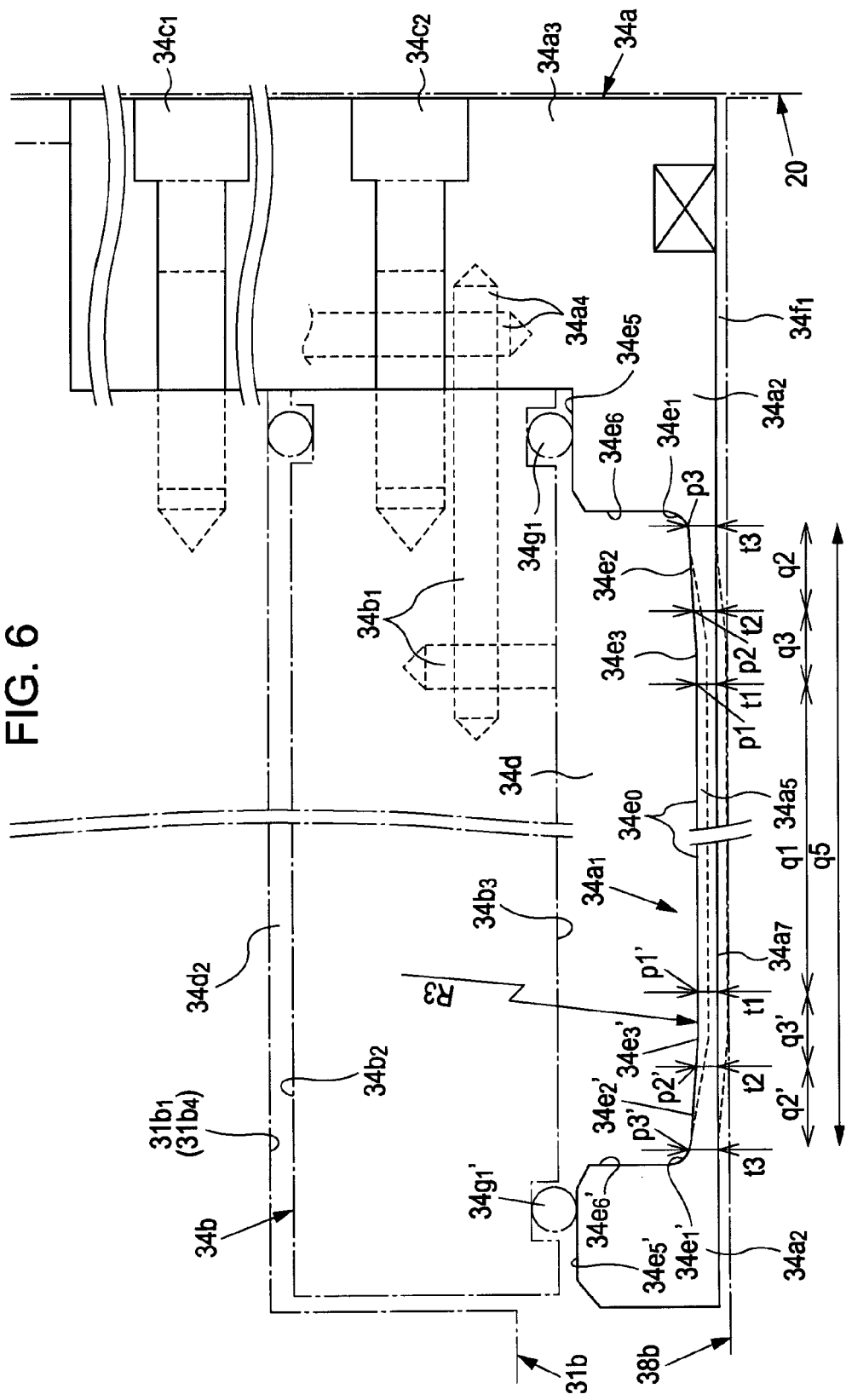
FIG. 6 is an enlarged cross-sectional view entirely showing a primary portion (near thin-wall section) of a clamp sleeve according to a first embodiment defining the clamp mechanism of the present invention.

In addition, regarding a cross section in the axial direction, the cylindrical portion 34a2 of the clamp sleeve 34a has the annular groove 34a1 recessed inward in the radial direction with respect to the axis line. The annular groove 34a1 is continuously formed around the outer periphery in the region inside outer peripheral ends 34e5, 34e5' at the shaft ends in the axial direction. Herein, the clamp sleeve 34a which is a feature of the present invention will be described in detail with reference to FIG. 6 providing an enlarged view of a primary portion of the clamp sleeve 34a. FIG. 6 is an enlarged view showing a peripheral portion (cross-sectional view in the axial direction) of the annular groove 34a1 such that FIG. 5 is rotated rightward by 90°. For the convenience of illustration, members other than those of the clamp sleeve 34a are indicated by dotted lines.

FIG. 6 illustrates a clamp sleeve of a first embodiment, in which linear second transition surfaces and third transition surfaces with a further reduced curvature are continuously arranged between first transition surfaces continuously arranged from inner end surfaces of the clamp sleeve and a groove bottom surface.

Figure 7:
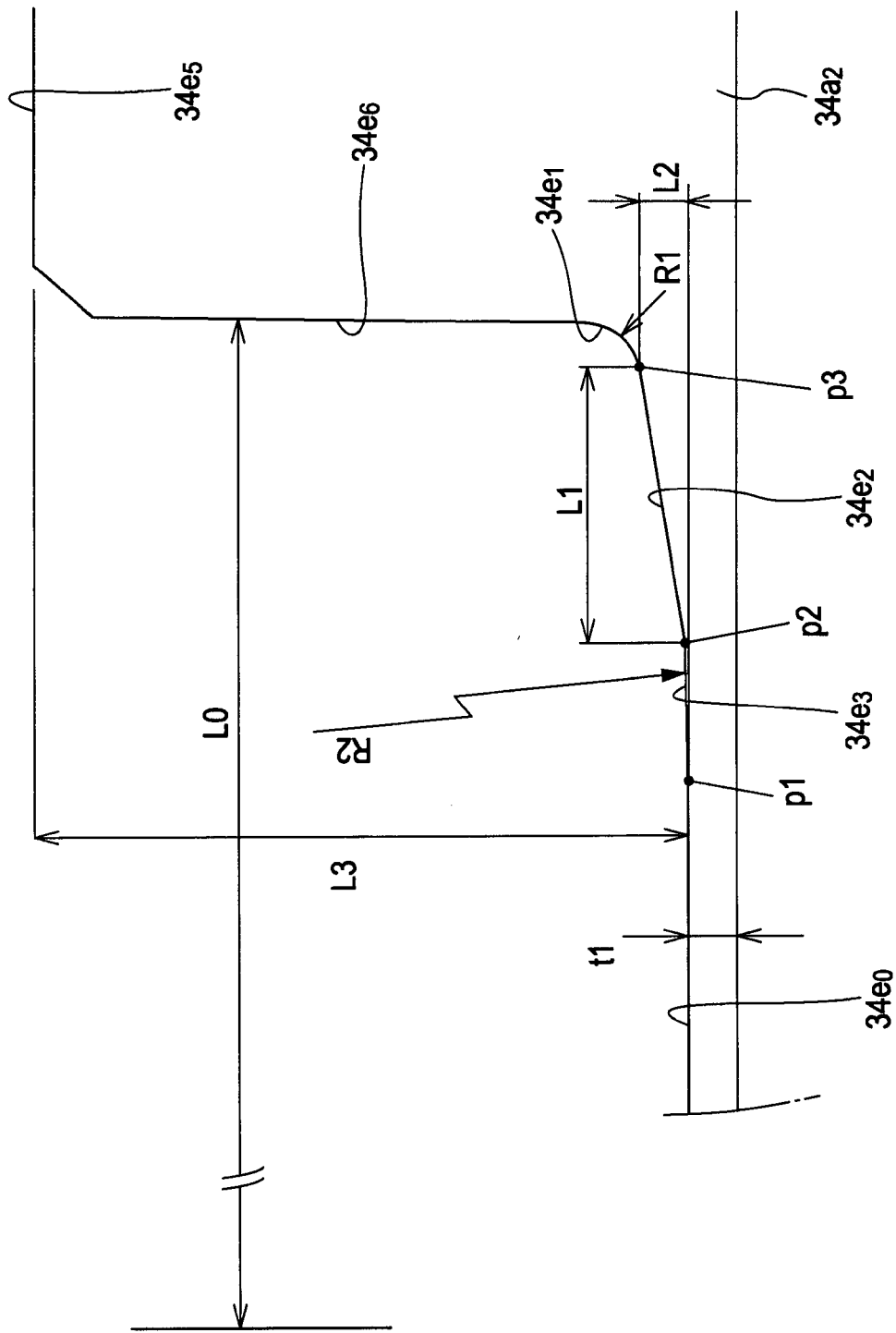
FIG. 7 is an enlarged cross-sectional view showing a portion proximate to a second transition surface of the clamp sleeve in FIG. 6.

Referring to FIGS. 6 and 7, a cylindrical portion 34a2 of a clamp sleeve 34a has an annular groove 34a1 around an outer periphery of the cylindrical portion 34a2. The annular groove 34a1 extends inward in the radial direction of the rotary shaft with respect to outer peripheral ends 34e5, 34e5' and formed in a range q5 in the drawing located inside the outer peripheral ends 34e5, 34e5' in the axial direction. Briefly describing the annular groove 34a1, the annular groove 34a1 includes a pair of inner end surfaces 34e6, 34e6' extending inward in the radial direction of the rotary shaft (A axis) with respect to the outer peripheral ends 34e5, 34e5' at both shaft ends and separated from each other along the rotary shaft; a groove bottom surface 34e0 extending in parallel to an inner peripheral end 34a7; and first transition surfaces 34e1, 34e1' whose one ends are continuously arranged from the inner end surfaces 34e6, 34e6'. In addition, the annular groove 34a1 includes second transition surfaces 34e2, 34e2' and third transition surfaces 34e3, 34e3' continuously formed between the first transition surfaces 34e1, 34e1' and the groove bottom surface 34e0.

The annular groove 34e0 is provided such that a thickness t1 which is a distance between the groove bottom surface 34e0 and the inner peripheral end 34a7 in a region provided with the groove bottom surface 34e0 is a thickness which allows that portion to be deformable when pressure fluid is supplied to a pressure chamber 34d (described later). The portion with the thickness t1 is a thin-wall section (linearly extending portion 34a5) in a region q1 in the drawing defined by the groove bottom surface 34e0 and the inner peripheral end 34a7. In addition, a predetermined gap 34f1 is provided between the inner peripheral end 34a7 and the cylinder segment 38b, so as not to interrupt rotation of the cylinder segment 38b, and to allow the linearly extending portion 34a5 to be deformed to press and hold the cylinder segment 38b during a clamping operation (described later).

Both ends p1, p1' of the groove bottom surface 34e0 defining the linearly extending portion 34a5 continue to, toward the shaft ends, the third transition surfaces 34e3, 34e3' in regions q3, q3' in the drawing, the second transition surfaces 34e2, 34e2' in regions q2, q2' in the drawing, the first transition surfaces 34e1, 34e1', and then to the inner end surfaces 34e6, 34e6'. The plurality of continuously arranged surfaces define the annular groove 34a1. The linearly extending second transition surfaces 34e2, 34e2' have a smaller inclination angle with respect to the rotary shaft than an inclination angle of lines connecting start points and end points p3, p3' of the first transition surfaces 34e1, 34e1'. The third transition surfaces 34e3, 34e3' provided as the arcuate surfaces have a smaller inclination angle, defined by lines connecting start points p1, p1' and end points p2, p2' thereof, with respect to the rotary shaft than the inclination angle of the second transition surfaces 34e2, 34e2'. The arcuate surfaces are recessed with respect to the line (i.e., the arcuate surfaces protrude downward).

The second transition surfaces 34e2, 34e2' are provided as linear inclined surfaces extending in the region q2 between the start point p2 and the end point p3 and in the region q2' between the start point p2' and the end point p3'. Distances (that is, thicknesses) between the second transition surfaces 34e2, 34e2' and the inner peripheral end 34a7 toward the end points p3, p3' increase with a predetermined gradient. The start points p2, p2' of the second transition surfaces 34e2, 34e2' continue to both ends p1, p1' of the groove bottom surface 34e0 through the third transition surfaces 34e3, 34e3' which are arcuate surfaces having a larger curvature radius R1 than a curvature radius of the second transition surfaces. On the other hand, the end points p3, p3' of the second transition surfaces 34e2, 34e2' continue to end portions of the inner end surfaces 34e6, 34e6' through the first transition surfaces 34e1, 34e1' which are arcuate surfaces (rounded surfaces) having a curvature radius of about several millimeters (specifically, about 2 to 8 mm).

In particular, regarding a curvature, which is a ratio between a length L1 of each of the second transition surfaces 34e2, 34e2' from the start point to the end point along the rotary shaft and an increased length from the inner peripheral end in that section (i.e., thickness increase L2), the second transition surfaces 34$e$2, 34$e$2' have a further reduced curvature than that of the first transition surfaces 34$e$1, 34$e$1'. Regarding a curvature, which is a ratio between a length of each of the third transition surfaces 34$e$3, 34$e$3' from the start point to the end point along the rotary shaft (i.e., length in the region q3 in the drawing) and an increased length from the inner peripheral end in that section (i.e., thickness increase $\Delta t = t2 - t1$), the third transition surfaces 34$e$3, 34$e$3' have a further reduced curvature than that of the second transition surfaces 34$e$2, 34$e$2'. Other ends of the inner end surfaces 34$e$6, 34$e$6' continue to the outer peripheral ends 34$e$5, 34$e$5' through tapered surfaces (c surfaces) although not shown in the drawing.

A relationship among thicknesses t1, t2, t3 is thickness t1≦thickness t2<thickness t3, where the thickness t1 is a thickness of the linearly extending portion 34$a$5 in the region q1 defined by the end portions p1, p1' of the groove bottom surface 34$e$0, the thickness t2 is a distance between the start points p2, p2' of the second transition surfaces 34$e$2, 34$e$2' and the inner peripheral end 34$a$7, and the thickness t3 is a distance between the end points p3, p3' of the second transition surfaces 34$e$2, 34$e$2' and the inner peripheral end 34$a$7. The thickness t1 is set to allow that portion to be deformed inward in the radial direction of the rotary shaft when pressure fluid is supplied to a pressure chamber (described later). The thickness t2 is set to allow at least a portion of the second transition surface to be deformable when pressure fluid is supplied (described later). As described above, the second transition surfaces 34$e$2, 34$e$2' are provided such that the thickness thereof, which is the distance to the inner peripheral end 34$a$7, increases from the end portions p1, p1' of the groove bottom surface 34$e$0 toward the end points p3, p3' in the axial direction.

A pressure chamber 34$d$ is defined by a space surrounded by the pressure-receiving member 34$b$ and the annular groove 34$a$1 including the plurality of surfaces formed at the cylindrical portion 34$a$2. Also, an inner peripheral end 34$b$3 of the pressure-receiving member 34$b$ has annular grooves (not shown) over the entire periphery of the inner peripheral end. The annular grooves accommodate a pair of seal members 34$g$1, 34$g$1'. The seal members 34$g$1, 34$g$1' are inserted into the annular grooves to be non-movable relative to the pressure-receiving member 34$b$ and to be in contact with the outer peripheral ends 34$e$5, 34$e$5' of the cylindrical portions 34$a$2, 34$a$2'. The seal members 34$g$1, 34$g$1' hold an air-tight or liquid-tight state for the pressure chamber 34$d$. On the other hand, a channel 34$b$1 is formed at an inner peripheral end 34$b$3 of the pressure-receiving member 34$b$ to communicate with the pressure chamber 34$d$. The channel 34$b$1 communicates with a channel 34$a$4 provided to surface the flange portion 34$a$3 of the clamp sleeve 34$a$, and with a fluid supply source (not shown).

A predetermined gap 34$d$2 is provided between an inner peripheral surface 31$b$4 of the through hole 31$b$1 of the housing 31$b$ and an outer peripheral surface 34$b$2 of the pressure-receiving member 34$b$. The clamp sleeve 34$a$ may be made of a material which is more elastic than a casting. The material may be an alloy steel for machine structural use containing, nickel, chromium, molybdenum, etc. The materials of the rotary shaft, the housing, and the pressure-receiving member 34$b$ may be, for example, a carbon steel for machine structural use. A specific numerical range of the gap 34$d$2 is from a few dozen thousandths of millimeter to 1 mm.

The second support head component 50 of the machining head 10 in the drawing will be described below in detail (FIG. 4).

As mentioned above, in addition to the first support head component 30, the machining head 10 in the embodiment includes the second support head component 50 that supports the first support head component 30. The first support head component 30 is attached to the ram 8 which supports a main-shaft head of the machine tool through the second support head component 50. The second support head component 50 is provided for rotating the first support head component 30 around an axis line (axis line parallel to the Z axis of the machine tool, referred to as "C axis" hereinafter) extending in the vertical direction (FIG. 4).

The second support head component 50 includes a housing 51 as a main body. The housing 51 has a through hole 51$a$ that extends along the C axis. The second support head component 50 also includes a rotary shaft 52 whose shaft member 52$a$ is disposed within the through hole 51$a$. The first support head component 30 is joined to the second support head component 50 through the rotary shaft 52. The second support head component 50 is attached to the ram 8 which supports the main-shaft head of the machine tool through an annular supporter 51$b$ attached to the housing 51.

The second support head component 50 includes a DD motor 53 for rotationally driving the rotary shaft 52, a clamp sleeve 54 for holding the rotational position of the rotary shaft 52, and a rotary joint 55 for supplying fluid to the first support head component 30, which are all disposed within the through hole 51$a$ of the housing 51.

The DD motor 53 is constituted by a stator 53$a$ fixed to the housing 51 through a stator sleeve 53$c$, and a rotor 53$b$ fixed to the rotary shaft 52 at a position facing an inner peripheral surface of the stator 53$a$. An exciting current for driving the DD motor 53 is supplied by a cable 17 connected to the stator 53$a$ through a connector 17$a$.

The rotary shaft 52 includes the shaft member 52$a$ disposed rotatably within the through hole 51$a$ of the housing 51, and a flange member 52$b$ attached to an end of the shaft member 52$a$ proximate to the first support head component 30 and extending outward radially (in directions perpendicular to the C axis). The rotary shaft 52 has a through hole 52$c$ through which the rotary joint 55 extends.

As shown in the figure, the shaft member 52$a$ and the flange member 52$b$ of the rotary shaft 52 have a bearing housing 52$d$ therebetween. The bearing housing 52$d$ and the housing 51 have a bearing 56 interposed therebetween. With the bearing 56, the rotary shaft 52 is supported in a rotatable manner relative to the housing 51. The bearing 56 in the embodiment in FIG. 3 is a triple cylindrical roller bearing (triple roller bearing/axial-radial roller bearing), which is a type of compound-roller pivot bearing, and is capable of receiving large amounts of load in the axial and radial directions.

The rotor 53$b$ of the DD motor 53 is fitted around the outer peripheral surface of the shaft member 52$a$. When the rotor 53$b$ rotates, the shaft member 52$a$ is rotationally driven around the C axis. The flange member 52$b$ is joined to the shaft member 52$a$ with a plurality of screw members 52$e$ arranged in the circumferential direction and thus rotates together with the shaft member 52$a$. Furthermore, the flange member 52$b$ has a plurality of screw members 19 screwed thereto in the circumferential direction. With the screw members 19, the supporting segment 30$c$ of the first support head component 30 is joined to the flange member 52$b$. Accordingly, when the DD motor 53 rotationally drives the rotary shaft 52, the first support head component 30 is rotated together with the rotary shaft 52.

The rotary joint 55 is similar to the rotary joints 37, 38 in the first support head component 30, and includes a distributor 55$a$ fixed to the housing 51 and a shaft 55$b$ rotatably fitted into a through hole 55a1 provided in the distributor 55a and disposed concentrically with the distributor 55a along the C axis.

The distributor 55a is constituted by a cylindrical portion 55a2 disposed within the through hole 52c of the rotary shaft 52 and a flange portion 55a3 extending outward radially from an end of the cylindrical portion 55a2 farthest from the first support head component 30. The flange portion 55a3 of the distributor 55a is joined to the housing 51 with a plurality of screw members arranged in the circumferential direction.

Also, the shaft 55b is joined to a disc-shaped flange member 57 at an end thereof proximate to the first support head component 30. The shaft 55b is joined to the flange member 52b of the rotary shaft 52 through the flange member 57. Consequently, the shaft 55b rotates together with the rotary shaft 52. The flange member 57 has a shape that can be fitted to a circular recess 30c1 provided in the supporting segment 30c of the first support head component 30. With the flange member 57 and the recess 30c1 of the supporting segment 30c, the first support head component 30 and the second support head component 50 can be properly positioned with respect to each other when being joined to each other.

The distributor 55a has a plurality of fluid channels 55a4 arranged at different positions in the circumferential direction. The fluid channels 55a4 are provided for taking in fluid from the outside. On the other hand, the shaft 55b has a plurality of fluid channels 55b1 that correspond to the fluid channels 55a4 of the distributor 55a. Fluid channels 55b1 are arranged at different positions in the circumferential direction.

The fluid channels 55a4 and the fluid channels 55b1 corresponding thereto communicate with each other through annular grooves extending around an engagement surface between the distributor 55a and the shaft 55b. This communication state is maintained even upon rotation of the shaft 55b. Also, the plurality of fluid channels 55b1 provided in the shaft 55b communicate with the corresponding fluid channels 37a3, 38a3 provided in the distributors 37a, 38a of the rotary joints 37, 38 of the first support head component 30. Accordingly, fluid supplied to the distributor 55a of the rotary joint 55 from the outside is sent to the rotary joints 37 and 38 of the first support head component 30 via the shaft 55b.

The distributor 55a fixed to the housing 51 and the shaft member 52a of the rotary shaft 52 have the clamp sleeve 54 disposed therebetween for holding the rotational position of the rotary shaft 52. The clamp sleeve 54 has a flange portion 54a at which the clamp sleeve 54 is joined to the distributor 55a with a plurality of screw members, and is rotatable relative to the rotary shaft 52. The clamp sleeve 54 has a cylindrical portion 54b provided with an annular groove 54c which is open towards the cylindrical portion 55a2 of the distributor 55a. The annular groove 54c and the outer peripheral surface of the cylindrical portion 55a2 of the distributor 55a form a pressure chamber.

When pressure fluid is supplied to the pressure chamber through a fluid channel 54d provided in the distributor 55a, a thin-wall section of the cylindrical portion 54b, which corresponds to the annular groove 54c of the cylindrical portion 54b, is deformed in a diameter-increasing direction (i.e., outward in the radial direction) of the cylindrical portion 54b. As a result, a clamping force acts on the rotary shaft 52 in the diameter-increasing direction, whereby a state is attained in which the rotary shaft 52 is prevented from rotating (clamping state).

In the illustrated embodiment, an upper end portion of the rotary joint 55 is provided with a rotation detector 44 for detecting the amount of rotation of the rotary shaft 52, namely, the amount of rotation of the first support head component 30. The rotation detector 44 includes a pair of detector heads 44a, 44a disposed at predetermined positions on the distributor 55a, and a detector ring 44b which is attached to the shaft 55b rotatable together with the rotary shaft 52 so as to surface the detector heads 44a, 44a. Similar to the rotation detector 41 in the first support head component 30, a detection signal of the rotation detector 44 is sent to the control apparatus of the machine tool and is used for rotation control of the first support head component 30.

In the machining head 10 having the above-described configuration, the support head component (the first support head component 30) for supporting the spindle unit 20 sandwiches the spindle unit 20 between the two support shafts of the pair of leg segments 30a and 30b so as to securely support the spindle unit 20 in a non-rotatable manner relative to the two support shafts. Using the DD motor 33 to rotate the driving support shaft of the leg segment 30a, the spindle unit 20 is rotated about the rotary axis line of the support shafts (i.e., axis line or A axis extending perpendicular to the rotary axis line of the spindle 21) to a desired angular position.

When the spindle shaft of the spindle unit 20 is driven to be positioned at a desired angle around the A axis, the rotary shaft 32 (the rotary shaft 39) is rotationally driven by the DD motor 33 whose amount of rotation is controlled by the control apparatus of the machine tool. The DD motor 33 is driven in accordance with numerical control based on a preliminarily set program. The rotation of the rotor 33a is controlled by selectively exciting an electromagnet (not shown) of the stator 33b. Accordingly, the angular position of the spindle unit 20 is controlled via the driving support shaft. Consequently, the DD motor 33 and the driving support shaft (i.e., the rotary shaft 32 and the shaft 37b) linked with the DD motor 33 within the leg segment 30a function as an indexing mechanism for the spindle unit 20. An exciting current for driving the DD motor 33 is supplied by a cable 16 connected to the DD motor 33 through a connector 16a.

When such driving for indexing the rotary shaft 32 (the rotary shaft 39) is completed, a clamping operation is carried out in which the pressure chamber 34d is supplied with the pressure oil from the fluid control circuit (not shown) including, for example, a pressure fluid supply source and an on-off valve, through the fluid channels 31b2. At this time, the thin-wall section 34a5 of the pressure chamber 34d expands inward in the radial direction with respect to the A axis and presses an outer peripheral end 38b2 of the shaft 38b. Accordingly, the rotary shaft 39 is held non-rotatably with respect to the housing 31b.

Figure 11:
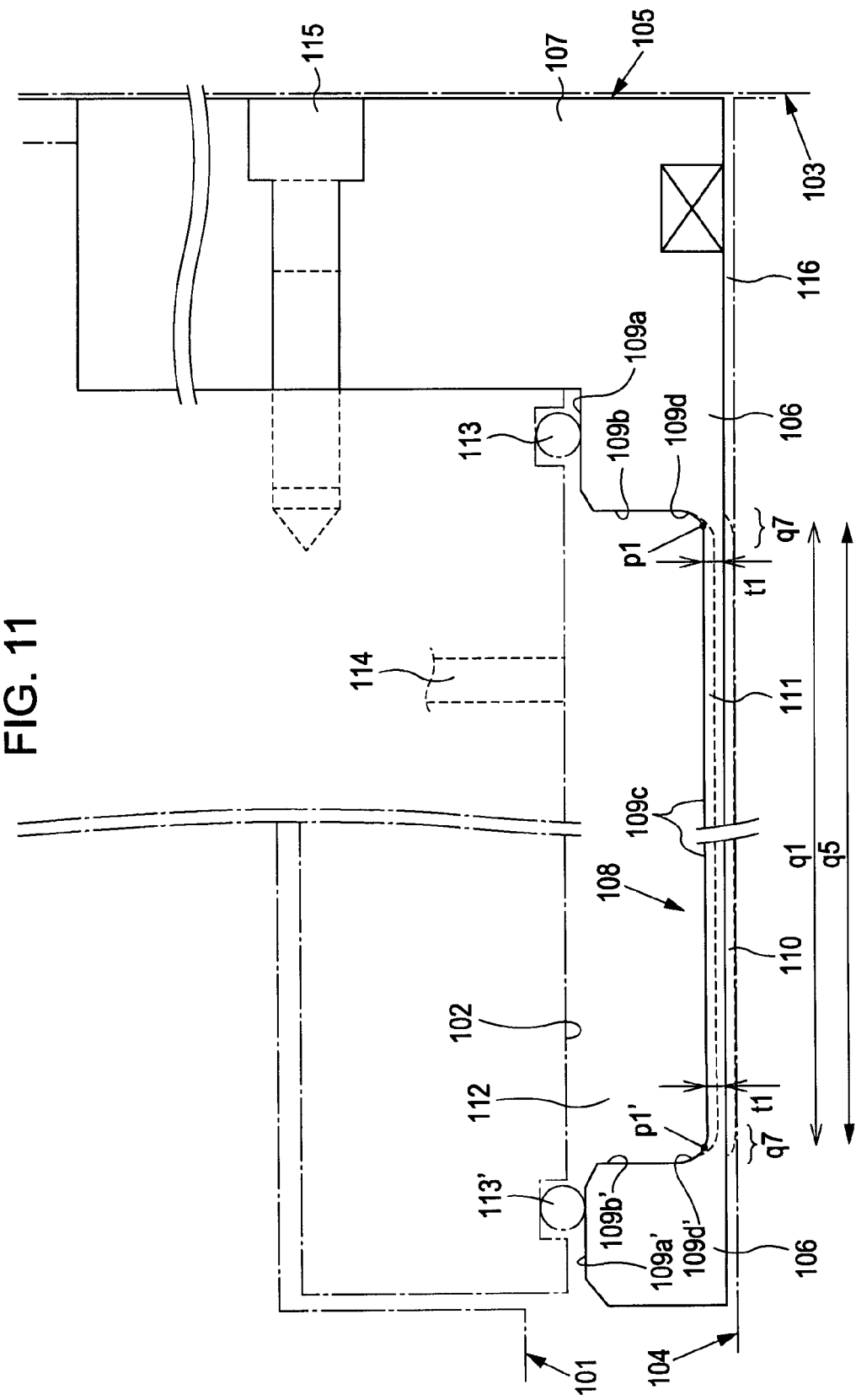
FIG. 11 is an enlarged cross-sectional view entirely showing a primary portion (near thin-wall section) of a clamp sleeve of related art included in a rotary table.

By supplying pressure fluid during a clamping operation, the pressure of the fluid is applied to the pressure-receiving member 34b which is a part of the pressure chamber 34d. Accordingly, the pressure-receiving member 34b also expands outward in the radial direction of the rotary shaft. However, since the predetermined gap 34d2 is provided between the inner peripheral surface 31b4 of the through hole 31b1 of the housing 31b and the outer peripheral surface 34b2 of the pressure-receiving member 34b, no pressure force (interaction force) is applied to the through hole 31b1 of the housing 31b at least until the outer peripheral surface 34b2 of the expanding pressure-receiving member 34b contacts the inner peripheral surface 31b4 of the through hole 31b1. With this structure, the rotary shaft with the angle thereof indexed can be prevented from being inclined because of a clamping operation. Unless such problem occurs, the pressure-receiving member 34b with the predetermined gap with respect to the through hole is not necessary. Like a rotary table shown in FIG. 11, the through hole 102 may function as a part of the pressure chamber 112.

With the clamp sleeve 34*a* having the second transition surfaces 34*e*2, 34*e*2' as the feature of the present invention, when pressure fluid is supplied to the pressure chamber 34*d* during a clamping operation, the thin-wall deformation portion of the bottom of the clamp sleeve 34*a* is entirely deformed in a bending manner, expands toward the outer peripheral end of the cylinder segment 38*b*, and presses the cylindrical section 38*b*. The thin-wall deformation portion is provided in the substantially deformable region q5, in particular, the regions q3, q3' for the second transition surfaces 34*e*2, 34*e*2', the regions q3, q3' for the third transition surfaces 34*e*3, 34*e*3', and the region q1 for the linearly extending portion 34*a*5 having the thickness t1 and provided with the groove bottom surface 34*e*0. Accordingly, the clamp sleeve 34*a* can hold the rotary shaft 39*a* integrally provided with the cylinder segment 38*b*, non-rotatably relative to the housing 31*b*.

Further, the second transition surfaces 34*e*2, 34*e*2' are provided such that the thickness thereof increases toward the end points p3, p3' located proximate to the shaft ends with respect to the linearly extending portion 34*a*5. In particular, the regions q3, q3' provided with the second transition surfaces become thinner toward the inner start points p2, p2' such that the thickness of the second transition surfaces approaches the thickness t1 of the linearly extending portion 34*a*5. Accordingly, when pressure fluid is supplied to the pressure chamber, a deformation amount in the regions q3, q3' provided with the second transition surfaces 34*e*2, 34*e*2' gradually increases toward the inside from the shaft ends (toward the linearly extending portion 34*a*5), whereas the deformation amount is constant in the region q1 provided with the groove bottom surface 34*e*0. The bottom of the clamp sleeve 34*a* is entirely deformed to be gradually bent over the region q5 in the drawing as indicated by dotted lines in FIG. 6, and hence, the bottom presses the cylinder segment 38*b* from the entire periphery of the cylinder segment 38*b*. That is, a portion which is greatly deformed in a narrow region is not provided, unlike a clamp sleeve of related art in which a transition surface with a rapid curvature is continuously arranged from a groove bottom surface (FIG. 8). Consequently, with the clamp sleeve of the present invention, even when deformation is repeated by supply of pressure fluid, progress in fatigue at the bottom of the annular groove 34*a*1 becomes slower than that of the related art. Therefore, the life becomes long.

The inventor of the present invention carried out bending stress (von Mises stress) analysis based on a cross-sectional shape of an actually designed product of a clamp sleeve, for a plurality of models with different dimensions for second transition surfaces. Regarding a maximum stress of each model, a permissible range of each dimension of the second transition surface for the clamp sleeve was obtained. The bending stress analysis uses a known analysis method such as a finite element method executed by an electronic calculator.

More specifically, the analysis uses finite element models whose cross sections each are divided into several tens of polyhedral elements by mesh division. Each of the models a different value for one of an axial section length L2 of a linearly provided second transition surface 34*e*2 and a thickness increase L1 to a first transition surface. Conditions for analysis of each finite element model include setting of elastic coefficients (Young's modulus, modulus of rigidity, Poisson's ratio, etc.) of an actual metal material, and application of a load corresponding to fluid pressure to nodes of a first transition surface, a second transition surface, and an outer peripheral surface of a linearly extending portion defining an annular groove (pressure chamber). With the stress analysis by the finite element method, a stress (von Mises stress) applied to each polyhedral element is obtained. If the obtained stress is below a predetermined limit value determined on the basis of a metal material and a support form, the designed finite element model (clamp sleeve), i.e., a section length L2 and a thickness increase L1 of a second transition surface 34*e*2 satisfy conditions. FIG. 7 shows dimensions (sections) of clamp sleeve for the analysis. FIG. 8 visually illustrates a deformed (distorted) state of a clamp sleeve which is secondarily obtained through a process of the stress analysis by the finite element method.

An example of analysis will be described below, regarding actual dimensions of the clamp sleeve 34*a*, actual dimensions of the annular groove, presence of first and second transition surfaces, dimensions of a second transition surface set for the analysis, and specific setting etc. for a boundary condition of the stress analysis.

(1) Actual Dimensions of Clamp Sleeve 34*a*

(a) An inner diameter of the inner peripheral end 34*a*7 of the clamp sleeve 34*a* is 363 mm, and an outer diameter of the outer peripheral end of the shaft 38*b* fitted to the clamp sleeve 34*a* is also 363 mm. The outer diameter of the outer peripheral end is slightly smaller than the inner diameter of the inner peripheral end 34*a*7 so that the gap 34*f*1 between the inner peripheral end 34*a*7 and the outer peripheral end of the shaft 38*b* is 0.05 mm.

(b) A whole length in the axial direction of the clamp sleeve 34*a* is 135 mm, an outer diameter of the flange portion 34*a*3 is 490 mm, and an outer diameter of the outer peripheral end 34*e*5 of the cylindrical portion 34*a*2 is 380 mm.

(2) Dimensions of Annular Groove (a) A width L0 of the annular groove 34*a*1 of the clamp sleeve 34*a* is 64 mm, and a depth L3 of the annular groove is 55 mm, the depth which is a distance from the outer peripheral end 34*e*5 to the groove bottom surface 34*e*0. With the above relationship, a thickness t1 of the linearly extending portion 34*a*5 is 1.5 mm.

(b) A curvature radius R1 of the first transition surface 34*e*1 provided as a rounded surface is 4 mm.

(3) Dimensions of Second Relief Face 34*e*2 Set for Analysis and Presence of Setting of First Relief Face 34*e*1 and Third Relief Face 34*e*3

(a) An axial length L1 in which the second transition surface 34*e*2 is provided is one of eight lengths including 0.2, 0.5, 1, 2, 3, 4, 5 and 6 mm.

(b) A thickness increase L2 increasing from a start point p2 to an end point p3 in a region provided with the second transition surface 34*e*2 is one of seven lengths including 3, 4, 5, 10, 15, 20, and 25 mm.

(c) A curvature radius R1 of the first transition surface 34*e*1 is 4 mm. The third transition surface 34*e*3 is provided, and the curvature radius R2 ranges from several tens of millimeters to several millimeters regarding the second transition surface.

(4) Specific Setting Relating to Boundary Condition of Stress Analysis (a) A load to be applied to the annular groove is an expected maximum hydraulic pressure of 100 kg·f/cm$^2$. The load is applied to the annular groove in a direction orthogonal to a plane of the annular groove.

(b) A metal material of the clamp sleeve is an alloy steel for machine structural use containing, nickel, chromium, molybdenum, etc. (for example, SCM435 in Japan Industrial Standard). A Young's module as an elastic coefficient of the material is 21088 kg·f/mm$^3$, a Poisson's ratio is 0.29, and a relative density of the material is 7.8.

(c) For the convenience of analysis, the inner peripheral end proximate to both shaft ends of the clamp sleeve are restrained.

(d) A gap between the inner peripheral end 34a7 of the clamp sleeve 34a and the outer peripheral end of the shaft fitted thereto is 0.05 mm.

Figure 9:
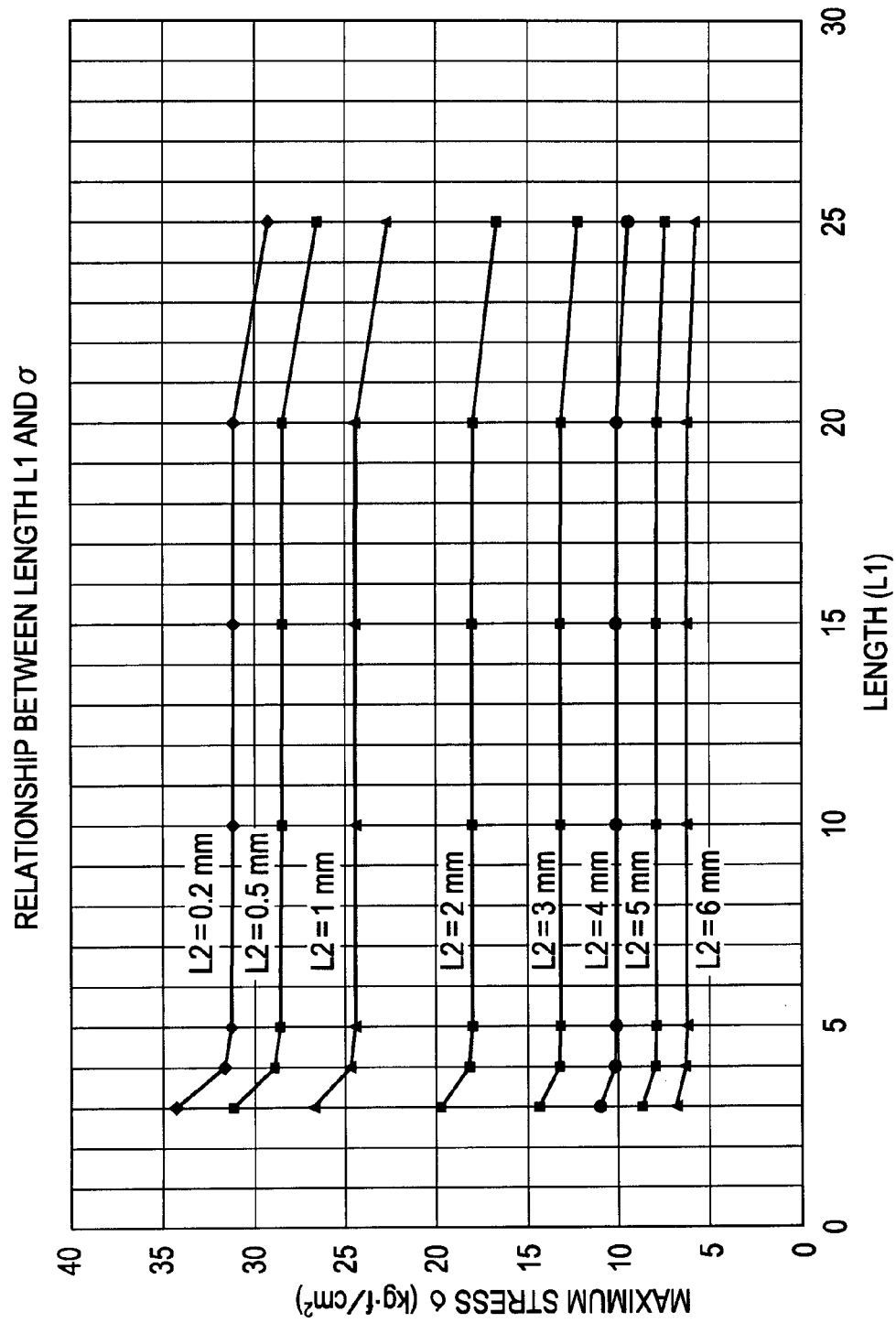
FIG. 9 is a graph showing a result of stress analysis of the clamp sleeve according to the first embodiment of the present invention.

Under the conditions, the stress analysis by the finite element method is carried out. FIG. 9 shows obtained maximum stresses (von Mises stress) as experimental data. In FIG. 9, the horizontal axis plots the length L1 of the linear second transition surface 34e2, and the vertical axis plots the maximum stress. Each thickness increase L2 is expressed in the graph. A limit value of the maximum stress (von Mises stress) is 30 kg·f/cm², with regard to a safety factor determined on the basis of a specific fatigue limit of a metal material, an application manner of a load (pulsating load), a variation in material, uncertainty of analysis accuracy, etc.

Referring to the experimental result, in any case of the thickness increase L2 of the second transition surface, the maximum stress a rapidly increases as the axial length L1 of the second transition surface becomes smaller than 4 mm. The maximum stress a becomes constant as the length L1 exceeds 5 mm. A numerical range below the derived limit value is attained when the length L1 of the second transition surface is 4 mm or larger and the thickness increase L2 of the second transition surface is 0.5 mm or larger.

When the axial length L1 of the second transition surface is increased, the stress is decreased. However, excessively increasing the length of the second transition surface causes the clamping force (holding force) to be decreased. Since the entire size of the clamp sleeve (in particular, an axial length or a width L0 of the annular groove) is restricted as described above, increasing the length L1 may cause the length of the linearly extending portion with the smaller thickness t1 than the thickness of the second transition surface to be decreased. According to the study by the inventors of the present invention, it was recognized that the length L1 may be 15 mm or smaller for actual use with regard to specifications of the rotary table, such as a table diameter. Thus, a desirable range of the length L1 may be preferably from 5 to 15 mm (i.e., the length L1 may be equal to or smaller than one third of the width L0 of the annular groove).

As the thickness increase L2 is increased, the stress is decreased. However, as the thickness is increased, the length of the region substantially deformable when pressure fluid is supplied becomes small, and the clamping force may be decreased. Although the current experiment by the inventors does not include analysis for a case where the thickness increase L2 is 7 mm or larger, an upper limit of the thickness increase L2 may be about 10 mm regarding the specifications of the rotary table or the like. In other words, a ratio of the thickness increase L2 with respect to the depth of the annular groove may be preferably equal to or smaller than one fifth.

Actual measurement of the clamping force and endurance test were carried out for a sample 1 of the present invention and a conventional product for the axial length L1 of the region provided with the thusly derived second transition surface and the thickness increase L2 in that region, as first and second verifications.

The details of the sample and the conventional product used in the comparative experiment are as follows.

(a) For the sample 1 of the present invention, the second transition surface has a length L of 8 mm and a thickness increase L2 of 1.5 mm. The third transition surface 34e3 having an arcuate surface is not provided.

(b) First transition surfaces of the sample 1 and the conventional product each have a curvature radius R1 of 4 mm. Linearly extending portions each have a thickness t1 of 1.5 mm. Other dimensions of the clamp sleeves are the same as the actual dimensions employed in the stress analysis.

In the first verification, the clamping force is actually measured to verify a decrease of the clamping force (clamping torque) of the sample 1 as compared with the conventional product. A clamping force (clamping torque) when pressure oil with a standard pressure of 35 kg·f/cm² is supplied to the pressure chamber was actually measured. Then, the clamping force of the sample 1 was 3060 Nm whereas the clamping force of the conventional product was 3400 Nm. It was found that the clamping force of the sample 1 be decreased by about 10% as compared with the conventional product. When pressure fluid with a relatively high pressure of 50 kg·f/cm² was supplied, the clamping force of the sample 1 was 4650 Nm whereas the clamping force of the conventional product was 4900 Nm. It was found that the clamping force of the sample 1 be decreased by about 5% as compared with the conventional product. The decrease in clamping force by such an amount is negligible in actual use.

In the second verification, a clamping operation and an unclamping operation are continuously carried out as an endurance test, in which compression by supply of pressure oil to the pressure chamber and decompression by release of pressure oil define one cycle. An increase in life of the sample 1 as compared with that of the conventional product is verified on the basis of the number of integrated cycles until a crack appears in the thin-wall section (i.e., until oil leak from a crack is detected). Regarding the conditions, pressure oil with a slightly high pressure of 50 kg·f/cm² is supplied, compression by supply of pressure oil for five seconds and decompression by release of pressure oil for five seconds define one cycle, and the operation is carried out by a number of cycles ranging from hundreds of thousand of cycles to one million and hundreds of thousand of cycles.

As a result, with the conventional product, oil leak occurred at the bottom of the clamp sleeve when the operation reaches about 400,000 cycles. In contrast, with the sample 1, no oil leak occurred even when the operation reaches 1,200,000 cycles. Accordingly, it was found that the life of the sample 1 be three-fold longer than the life of the conventional product.

The clamp sleeve including the second transition surface can be modified as follows.

In the first embodiment, the second transition surfaces are provided at both sides of the linearly extending portion with the thickness t1. However, to prevent a decrease in clamping force as much as possible, for example, a second transition surface may be provided only at a side proximate to the flange portion 34a3 (a side proximate to the inner end surface 34e6), or at a side farthest from the flange portion (a side proximate to the inner end surface 34e6'). The linearly extending portion 34a5 has the thickness t1 of 1.5 mm, however, the thickness t1 may be smaller than that value (specifically, the thickness t1 may be decreased to about 0.8 mm).

Figure 10:
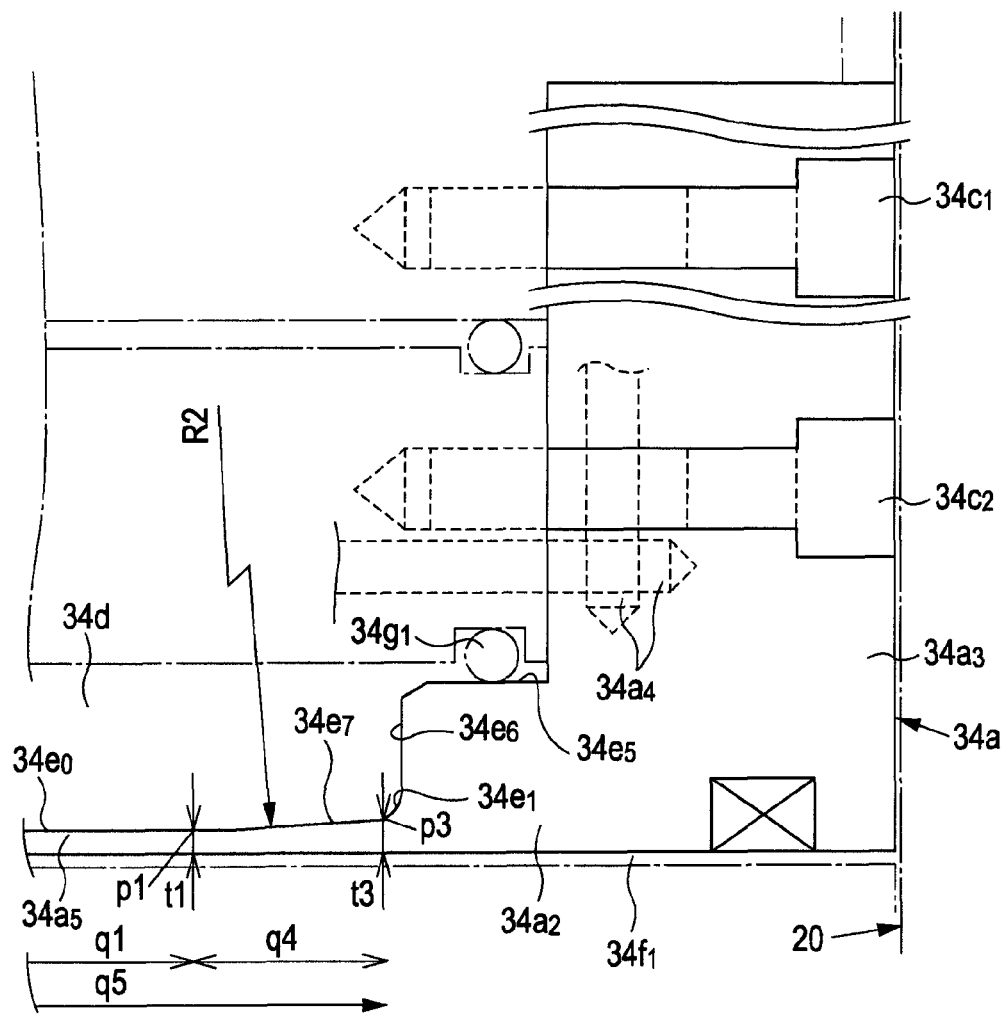
FIG. 10 is an enlarged cross-sectional view showing another example second transition surface of the clamp sleeve according to the first embodiment of the present invention.

In the first embodiment, the second transition surface is provided to have the linear cross-sectional shape (flat surface). However, the cross-sectional shape of the second transition surface may be curved (arcuate surface). In a second embodiment shown in FIG. 10, an arcuate surface is provided as a second transition surface 34e7 which has a curvature radius R2 and is recessed (protruding downward) with respect to a line connecting a start point and an end point instead of the linear second transition surface 34e2 of the first embodiment. The second transition surface 34e7 has a thickness gradually increasing toward the shaft ends. The second transition surface 34e7 is continuously arranged between the groove bottom surface 34e0 and the first transition surface 34e1. In this embodiment, a third transition surface is omitted. An axial length L1 and a thickness increase L2 of the second transition surface formed in a region q4 in the drawing as an arcuate surface may range in a similar manner to the first embodiment. In particular, the curvature radius R2 of the arcuate surface may be several tens millimeters or larger (specifically, 20 mm or larger) as a larger value than the curvature radius R1 of several millimeters of the first transition surface. Alternatively, a third transition surface may not be omitted. Both second and third transition surfaces may be provided as arcuate surfaces, and the third transition surface may have a larger curvature radius than that of the second transition surface.

In the first embodiment, the third transition surfaces 34e3, 34e3' are provided between the linear second transition surfaces 34e2, 34e2' and the linearly extending portion 34a5. The curvature radius of the third transition surfaces 34e3, 34e3' may be larger than that of the second transition surface, so that the curvature becomes reduced. In the first embodiment, the third transition surface is the arcuate surface with the curvature radius of about several tens of millimeters. However, the third transition surface may be a linearly tapered surface. In this case, an inclination angle of the third transition surface is determined to be smaller than that of the second transition surface.

In the two embodiments described above, while the first transition surfaces 34e1, 34e1' are provided as the arcuate surfaces with a curvature radius, the first transition surfaces 34e1, 34e1' may be provided as linearly inclined surfaces.

While the embodiments employ the configuration in which the drive source of the rotary shaft 39 is the DD motor, the drive source may be other motor or rotary driving mechanism.

In the embodiments, while the indexing mechanism of the spindle unit 20 to which the tool is attached is installed in the machining head for the machine tool, the indexing mechanism may be applied to other indexing device. For example, the indexing device (that is, rotary table) may include the rotary shaft for indexing the angle of a table on which a workpiece is mounted. For example, using the first embodiment (FIG. 5) as an example, the spindle unit 20 is omitted, the end surface 39b1 of the flange member 39b of the rotary shaft is formed as a flat surface without a step, and the screw member 15 for coupling the shaft member 39a, the bearing 36, and the flange member 39b is screwed into the shaft member 39a so as to be buried into the flange member 39b from the end surface 39b1. The end surface 39b1 provided as the flat surface of the flange member 39b serves as a table surface of the rotary table on which a jig (not shown) for fixing a workpiece is mounted.

In the first embodiment (FIG. 5), while a mechanism for rotationally driving the rotary shaft 39 being integral with the table surface is not provided. Like a known rotary table, a worm wheel may be integrally provided at the rotary shaft 39a, and a worm spindle, linked with a servomotor which can control, for example, the amount of rotation, may mesh with the worm wheel. Alternatively, a DD motor may rotationally drive the rotary shaft 39 like the leg segment 30a of the first embodiment.

A rotary table does not have to only have a rotary shaft orthogonal to a bed of a machine tool. In particular, a rotary table may have an indexing function for rotary shafts of two or more axes, and the present invention is applicable to a clamp mechanism of at least one shaft of such rotary table.

The technical scope of the present invention is not limited to the above embodiments, and modifications are permissible without departing from the scope of the claimed invention.

The invention claimed is:

1. A clamp sleeve arranged between a rotary shaft and a frame outside the rotary shaft and having a through hole and an annular groove, the annular groove continuously provided around an outer periphery of the clamp sleeve and defining a part of a pressure chamber to which pressure fluid is supplied,
   wherein the annular groove includes a pair of facing inner end surfaces extending in a radial direction with respect to an axis line and separated from each other, a groove bottom surface extending in parallel to the through hole, and arcuate first transition surfaces provided between the inner end surfaces and the groove bottom surface,
   wherein the annular groove is provided such that a thickness in a region provided with the groove bottom surface is a thickness to allow the region to be deformable when the pressure fluid is supplied to the pressure chamber, and
   wherein a second transition surface is provided at a side proximate to at least one of the two inner end surfaces, at a position between the first transition surface and the groove bottom surface, the second transition surface having a further reduced curvature than a curvature of the first transition surfaces.

2. The clamp sleeve according to claim 1, wherein the second transition surface is provided such that a distance between the second transition surface and the through hole gradually increases from a start point thereof proximate to the groove bottom surface toward an end point thereof.

3. The clamp sleeve according to claim 2, wherein the second transition surface is provided such that an axial length L1 from the start point proximate to the groove bottom surface to the end point is 4 mm or larger, and that an increase L2 of the distance between the second transition surface and the through hole in a section between the start point proximate to the groove bottom surface and the end point is in a range of from 0.5 to 6 mm.

4. The clamp sleeve according to claim 3, wherein the second transition surface is formed of one of a linearly inclined surface continuously arranged in the section between the start point proximate to the groove bottom surface and the end point and a recessed arcuate surface.

5. The clamp sleeve according to claim 4, wherein a third transition surface is further provided between the groove bottom surface and the second transition surface, the third transition surface having a further reduced curvature than the curvature of the second transition surface.

* * * * *